US012428887B2

(12) United States Patent
Määttä

(10) Patent No.: US 12,428,887 B2
(45) Date of Patent: Sep. 30, 2025

(54) HINGE MECHANISM

(71) Applicant: Microsoft Technology Licensing, LLC, Redmond, WA (US)

(72) Inventor: Esa-Sakari Määttä, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 611 days.

(21) Appl. No.: 17/340,415

(22) Filed: Jun. 7, 2021

(65) Prior Publication Data

US 2021/0293066 A1  Sep. 23, 2021

Related U.S. Application Data

(63) Continuation of application No. 16/409,401, filed on May 10, 2019, now Pat. No. 11,028,628, which is a
(Continued)

(51) Int. Cl.
*E05D 11/00* (2006.01)
*E05D 1/04* (2006.01)
(Continued)

(52) U.S. Cl.
CPC ............ *E05D 11/0081* (2013.01); *E05D 1/04* (2013.01); *G06F 1/1681* (2013.01); *H04M 1/022* (2013.01); *E05Y 2999/00* (2024.05)

(58) Field of Classification Search
CPC ..... E05D 11/0081; E05D 11/082; E05D 1/04; E05D 3/06; E05D 3/12; E05D 3/18;
(Continued)

(56) References Cited

U.S. PATENT DOCUMENTS 5,566,048 A  10/1996 Esterberg et al.
6,657,856 B1  12/2003 Lu
(Continued)

FOREIGN PATENT DOCUMENTS

CN   1573648 A   2/2005
CN   1738520 A   2/2006
(Continued)

OTHER PUBLICATIONS

"Office Action Issued in European Patent Application No. 17730332. 8", Mailed Date: Jun. 16, 2021, 6 Pages.
(Continued)

*Primary Examiner* — William L Miller
(74) *Attorney, Agent, or Firm* — Ray Quinney & Nebeker P.C.; Paul N. Taylor

(57) ABSTRACT

Technologies are described for a hinge mechanism coupled to at least a dual-display device wherein the displays can rotate with respect to each other through 360 degrees. The hinge mechanism has at least one flexible connection member that follows a generally S-shaped path when the displays are in a tablet position. In some embodiments, a second flexible connection member can be added that follows a mirrored S-shaped path. The S-shaped path of the first flexible connection member and the mirrored S-shape path of the second flexible connection member together create a cross-configuration. In other embodiments, interconnected friction hinges can allow for a free-stop function at any point along the 360 degrees of rotation.

19 Claims, 25 Drawing Sheets

Related U.S. Application Data continuation of application No. 15/182,325, filed on Jun. 14, 2016, now Pat. No. 10,301,858.

(51) Int. Cl.
  *G06F 1/16* (2006.01)
  *H04M 1/02* (2006.01)

(58) Field of Classification Search
  CPC .... G06F 1/1681; G06F 1/1618; H04M 1/022; H05K 5/0226; E05Y 2999/00
  See application file for complete search history.

(56) References Cited

U.S. PATENT DOCUMENTS

| | | | |
|---|---|---|---|
| 6,813,812 B2 | 11/2004 | Lu et al. | |
| 6,859,356 B2 | 2/2005 | Chih et al. | |
| 7,599,188 B2 | 10/2009 | Chen | |
| 7,752,711 B1 | 7/2010 | Chen et al. | |
| 7,895,711 B2 | 3/2011 | Shen | |
| 7,917,993 B2 | 4/2011 | Park | |
| 7,936,559 B2* | 5/2011 | Chen | G06F 1/1618 |
| | | | 361/679.29 |
| 7,958,602 B2 | 6/2011 | Nishizawa et al. | |
| 7,971,321 B2 | 7/2011 | Chen et al. | |
| 8,074,323 B2 | 12/2011 | Lin | |
| 8,982,542 B2* | 3/2015 | Bohn | G06F 1/1681 |
| | | | 361/679.28 |
| 9,185,815 B2* | 11/2015 | Hsu | E05D 3/12 |
| 9,265,166 B2 | 2/2016 | Hsu | |
| 9,307,660 B2 | 4/2016 | Tsao et al. | |
| 9,500,013 B2 | 11/2016 | Senatori | |
| 9,523,384 B2 | 12/2016 | Hsu | |
| 9,624,704 B1 | 4/2017 | Hsu | |
| 9,714,533 B2 | 7/2017 | Kuramochi | |
| 9,840,861 B1* | 12/2017 | Maatta | E05D 1/00 |
| 10,000,955 B2 | 6/2018 | Shang | |
| 10,061,359 B2* | 8/2018 | Maatta | G06F 1/1681 |
| 10,474,203 B2 | 11/2019 | Tazbaz et al. | |
| 10,501,973 B2* | 12/2019 | Maatta | G06F 1/1681 |
| 10,641,318 B2 | 5/2020 | Siddiqui | |
| 11,627,209 B2* | 4/2023 | Maatta | E05D 11/082 |
| | | | 16/342 |
| 12,235,687 B2* | 2/2025 | Siddiqui | G06F 1/1618 |
| 2008/0109995 A1 | 5/2008 | Kuwajima | |
| 2008/0151478 A1 | 6/2008 | Chern et al. | |
| 2009/0229080 A1 | 9/2009 | Chen | |
| 2010/0154169 A1 | 6/2010 | Chen et al. | |
| 2010/0232096 A1* | 9/2010 | Chen | G09F 9/301 |
| | | | 361/679.01 |
| 2011/0099756 A1* | 5/2011 | Chen | G06F 1/1681 |
| | | | 16/297 |
| 2012/0176736 A1 | 7/2012 | Apgar et al. | |
| 2013/0135809 A1 | 5/2013 | Uchiyama | |
| 2014/0036425 A1 | 2/2014 | Tsao et al. | |
| 2014/0043751 A1 | 2/2014 | Merz et al. | |
| 2015/0013107 A1* | 1/2015 | Shin | E05D 3/06 |
| | | | 16/366 |
| 2015/0362958 A1 | 12/2015 | Shang | |
| 2016/0032633 A1 | 2/2016 | Hsu et al. | |
| 2016/0161987 A1 | 6/2016 | Jacobs | |
| 2017/0177026 A1 | 6/2017 | Rittenhouse | |
| 2020/0064890 A1 | 2/2020 | Siddiqui | |
| 2020/0081501 A1 | 3/2020 | Lin et al. | |

FOREIGN PATENT DOCUMENTS

| | | |
|---|---|---|
| CN | 1809795 A | 7/2006 |
| CN | 101101020 A | 1/2008 |
| CN | 102562776 A | 7/2012 |
| CN | 102902307 A | 1/2013 |
| CN | 103455101 A | 12/2013 |
| CN | 203717626 U | 7/2014 |
| CN | 204790680 U | 11/2015 |
| JP | 2006064000 A | 3/2006 |
| JP | 4594936 B2 | 9/2010 |

OTHER PUBLICATIONS

"First Office Action and Search Report Issued in Chinese Patent Application No. 201780037201.0", Mailed Date: Oct. 8, 2021, 16 Pages.

"First Office Action And Search Report Issued in Chinese Patent Application No. 201780046804.7", Mailed Date : Oct. 25, 2021, 13 Pages.

"Notice of Allowance Issued in U.S. Appl. No. 16/296,000", Mailed Date: Oct. 13, 2022, 15 Pages.

"Non Final Office Action Issued in U.S. Appl. No. 16/296,000", Mailed Date: Feb. 25, 2022, 27 Pages.

"Notice of Allowance Issued in Chinese Patent Application No. 201780046804.7", Mailed Date: Mar. 14, 2022, 4 Pages.

"Office Action Issued in European Patent Application No. 17748598.4", Mailed Date: Mar. 22, 2022, 6 Pages.

"Notice of Allowance Issued in Chinese Patent Application No. 201780037201.0", Mailed Date: Mar. 30, 2022, 4 Pages.

"Non Final Office Action Issued in U.S. Appl. No. 16/296,000", Mailed Date: May 10, 2021, 16 Pages.

"Office Action Issued in European Patent Application No. 17748598.4", Mailed Date: Jan. 27, 2021, 5 Pages.

"Final Office Action Issued in U.S. Appl. No. 16/296,000", Mailed Date: Aug. 31, 2021, 30 Pages.

"Notice of Allowance Issued in European Patent Application No. 17748598.4", Mailed Date: Aug. 9, 2023, 8 Pages.

"Final Office Action Issued in U.S. Appl. No. 16/296,000", Mailed Date: Jul. 21, 2022, 19 Pages.

* cited by examiner

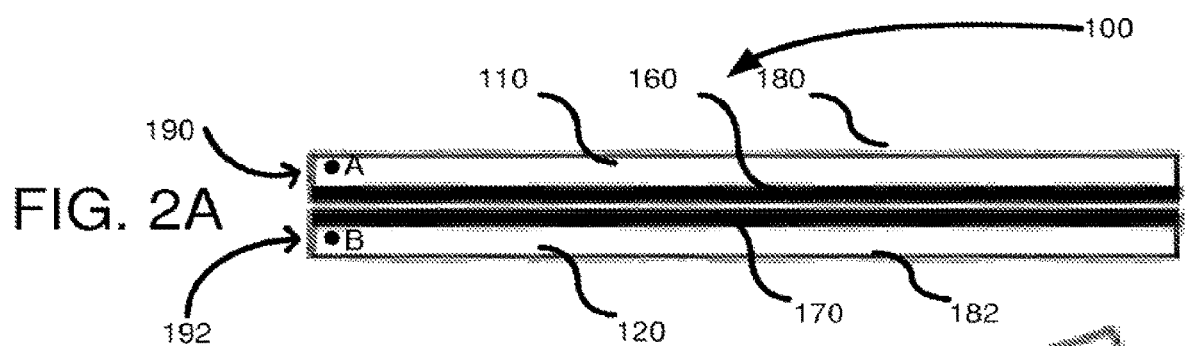
FIG. 2A
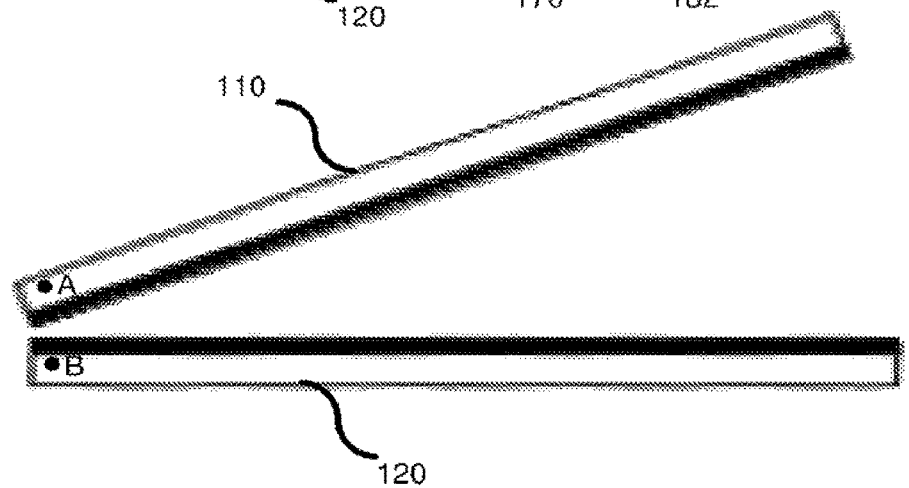
FIG. 2B
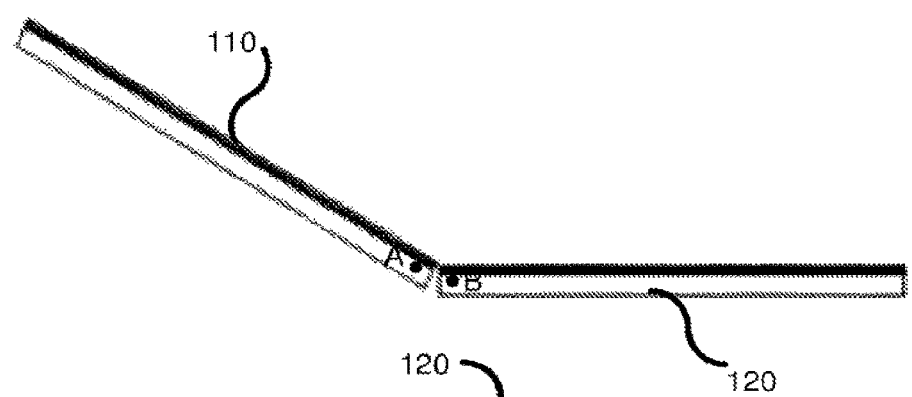
FIG. 2C
FIG. 2D
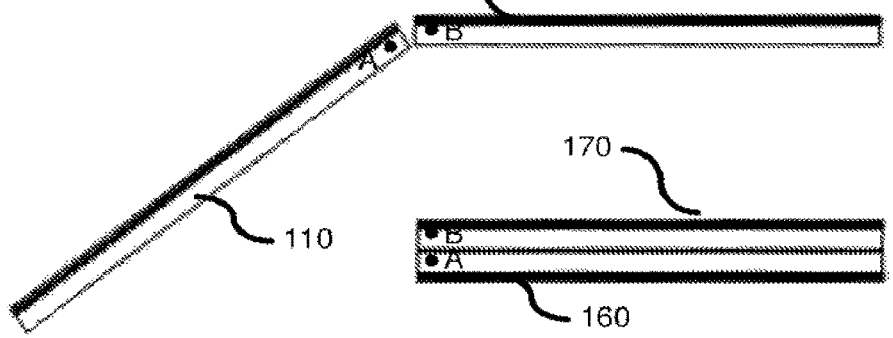
FIG. 2E

HINGE MECHANISM

CROSS-REFERENCE TO RELATED APPLICATION

This is a continuation of U.S. application Ser. No. 16/409,401, filed May 10, 2019, which is a continuation of U.S. application Ser. No. 15/182,325, filed Jun. 14, 2016, now, U.S. Pat. No. 10,301,858, which are incorporated herein by referenced in their entireties.

BACKGROUND

Modern mobile phones and tablets have evolved over recent years to the point where they now possess a broad range of capabilities. They are not only capable of placing and receiving mobile phone calls, multimedia messaging (MMS), and sending and receiving email, but they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run web browsers, navigation systems, media players and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. This is not desirable, as users want their mobile phone to fit comfortably in their hand or in a shirt or pants pocket.

As a result, dual-display devices are becoming more popular. With a dual-display device, the mobile phone or tablet can include an open, expanded position where both displays are flush so that the user feels like there is a single integrated display. In a closed, condensed position, both displays are face-to-face so as to protect the displays. In a fully-open position, the dual displays can sit back-to-back so the user needs to flip the device to view the opposing display.

Hinges for such dual-display devices are problematic. Typically, the hinges can protrude from the device as it switches between positions. As devices continually become thinner, hinges need to be adapted to accommodate the thinner displays without further protrusion from the back of the device as it is opened and closed. Additionally, excess slack can make the two displays feel loosely connected. Other problems include that the displays do not open and close smoothly. Still yet another problem is the ability to stop the displays in any position as the displays are opened and closed. Torque or friction hinges are known and offer resistance to a pivoting motion. However, the friction hinges can be bulky and protrude from the device.

Therefore, it is desirable to provide improved hinges for multiple display devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for a hinge mechanism coupled to at least a dual-display device wherein the displays can rotate with respect to each other through 360 degrees. When the device is dual displays, the displays can be face-to-face in a closed position, in a single plane in an open-book or tablet position, and back-to-back in a fully-open position. The hinge mechanism has at least one flexible connection member that follows a generally S-shaped path when the displays are in a tablet position. In some embodiments, a second flexible connection member can be added that follows a mirrored S-shaped path. The S-shaped path of the first flexible connection member and the mirrored S-shape path of the second flexible connection member together create a cross-configuration.

Each device can include a hinge lug that has top and bottom channels for receiving the flexible connection members. Both the first and second flexible connection members can be coupled together through a termination block. A screw can be threaded through the hinge lug and push on the termination block so as to create tension in the first and second flexible connection members. Alternatively, a spring can be used in conjunction with the termination block to create tension in the flexible connection members.

In other embodiments, friction hinges can be used in conjunction with the flexible connection members. The friction hinges can be coupled together through a gearing mechanism so that the friction hinges cooperatively combine to provide a free-stop function.

The hinges provide numerous advantages. Foremost, the flexible connection members stay within the channels of the hinge lugs and do not extend (or extend minimally) beyond the surface of the dual-display device as it is being rotated through 360 degrees. Moreover, the flexible connection members can be easily tightened, such as by turning a screw that is exposed externally with the dual-display device in a closed position. Moreover, the friction hinge can allow the device to free stop in any position through the 360 degree rotation. The hinge mechanisms and the friction hinges can be positioned adjacent to one another to provide both features simultaneously.

As described herein, a variety of other features and advantages can be incorporated into the technologies as desired.

BRIEF DESCRIPTION OF THE DRAWINGS

FIGS. 2A-2E show a progression between a closed position with displays positioned face-to-face to a fully open position wherein the displays are shown back-to-back.

DETAILED DESCRIPTION

Figure 1:
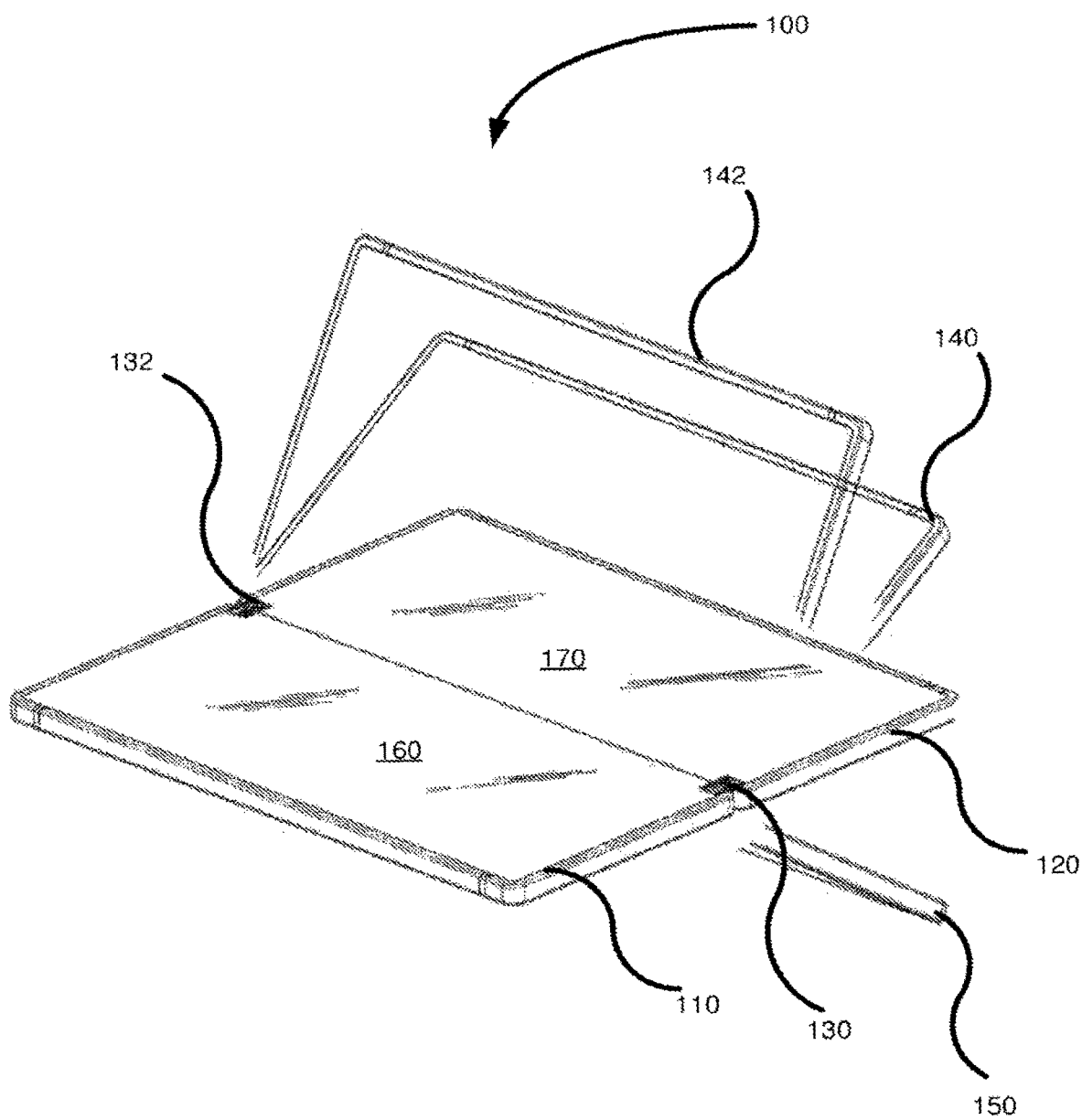
FIG. 1 shows a dual-display device coupled using hinges according to one embodiment, wherein the dual-display device is shown rotating to various positions.

FIG. 1 shows an embodiment of a hinged mobile electronic device 100 comprising a first display device 110 and a second display device 120 coupled together with one or more hinges 130, 132. The mobile electronic device 100 can be, for example, a hand-held device, such as a smart phone, or a portable computer, such as a lap-top. Each device 110, 120 can include a display and each device sits end-to-end with the hinges 130, 132 coupling the ends together with sufficient tension that the devices can pivot relative to each other around the ends. The mobile electronic device 100 is shown in a tablet mode with the first and second display devices aligned in a plane so as to form a larger display area. As shown in phantom lines 140, 142, the second display device 120 can rotate counterclockwise relative to display device 110 or can rotate clockwise, as shown by phantom line 150. As described further below, the hinges 130, 132 allow a full 360 degrees of rotation between the first and second display devices 110, 120. For purposes of brevity, the embodiments described herein are shown for two-display devices, but can be extended to additional display devices, such as 3 or more displays.

The first and second display devices 110, 120 can comprise a plurality of user interface screens 160, 170, respectively. The screens 160, 170 can be used for user input and/or display purposes. The screens 160, 170 can also be replaced with a plurality of smaller screens and/or other user interface mechanisms, such as a keyboard. Exemplary embodiments of the hinged mobile electronic device can comprise such user interface mechanisms on any surfaces and on any combination of surfaces as desired.

FIGS. 2A-2E show different positions that the hinged mobile electronic device 100 can take. In FIG. 2A, the first display device 110 includes the screen 160 on a device face (shown in dark) and a back surface 180. Likewise, the second display device 120 is shown with the screen 170 on a device face (shown in dark) and a back surface 182. Ends of the first and second display devices are shown at 190, 192, respectively, and points labeled A and B show the relative pivoting motion between the first and second display devices 110, 120. FIG. 2A represents a closed position wherein the screens 160, 170 are face-to-face. In the closed position, the screens are protected and generally not visible to the user with point A above point B.

FIG. 2B shows the first display device 110 open at an angle of about 30 degrees with respect to the second display device 120. Note that the point A remains in a position above point B. In FIG. 2C, the hinged mobile electronic device 100 is nearly in a tablet mode wherein the screens 160, 170 are in a same plane so as to give an appearance of a single unitary display. The tablet mode represents a relative rotation of 180 degrees. FIG. 2C shows a relative rotation of about 150 degrees from the position shown in FIG. 2A. FIG. 2D shows that the point A can rotate past point B so as to have a rotation angle of about 230 degrees. Finally, in FIG. 2E, the hinged mobile device 100 is in a fully open position with 360 degrees of rotation from the initial position in FIG. 2A. Point A now sits below Point B and the screens 160, 170 are outwardly facing while the first and second display devices are back-to-back.

Figure 3:
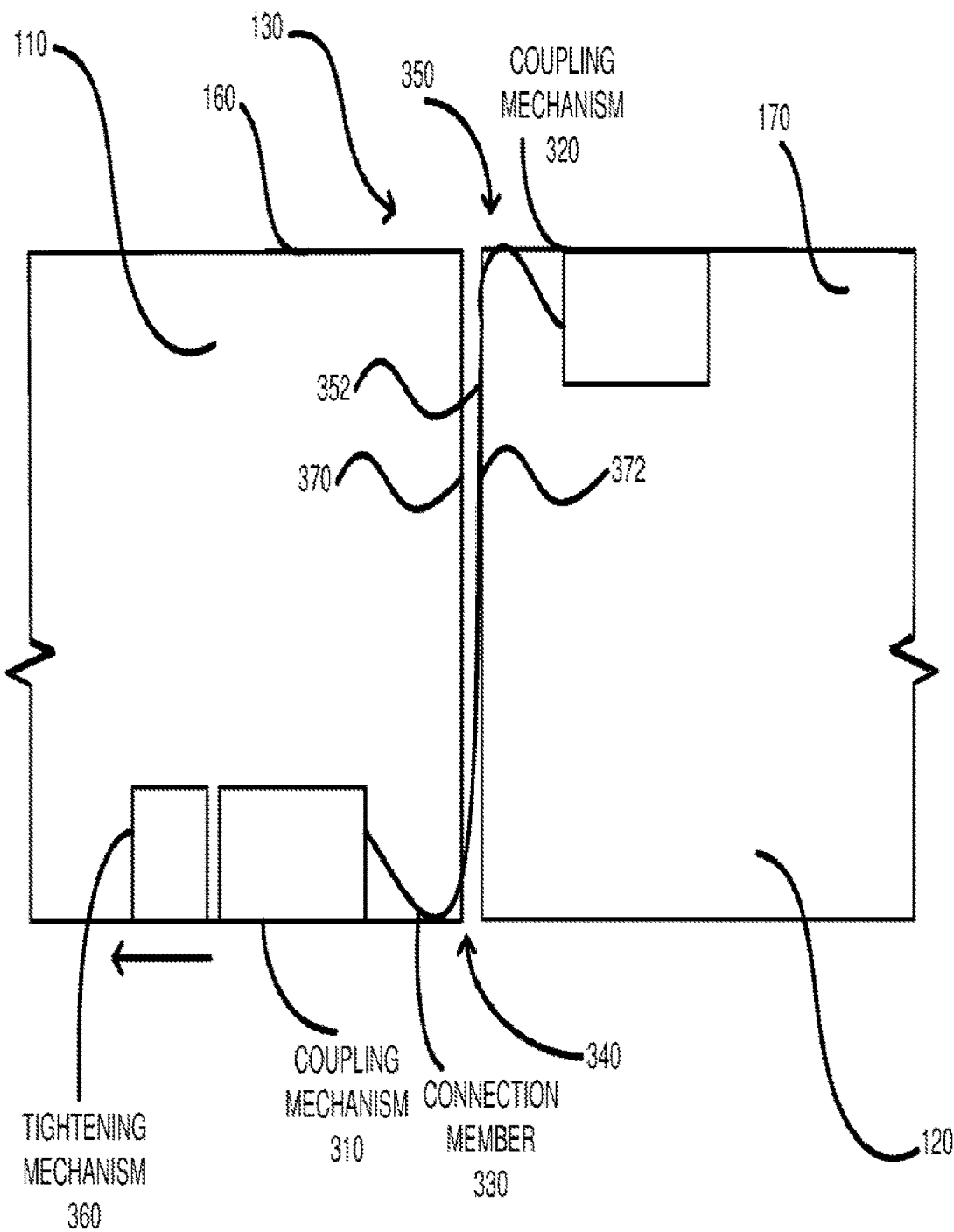
FIG. 3 is an embodiment of a hinge having one flexible connection member following an S-shaped path with a single tightening mechanism to create tension in the flexible connection member.

FIG. 3 shows a side-elevational view of an embodiment of the first display device 110 and the second display device 120 coupled together with the hinge 130. In this embodiment, the hinge 130 includes a first coupling mechanism 310 coupled to the first display device 110, a second coupling mechanism 320 coupled to the second display device 120 and a flexible connection member 330 coupled between the first and second coupling mechanisms 310, 320. The flexible connection member 330 follows a generally S-shaped path with a first bend shown at 340 and a reverse bend shown at 350. Intermediate the first bend 340 and the reverse bend 350 is a middle portion 352 of the connection member 330, which runs parallel to and between an end 370 of the first display device 110 and an end 372 of the second display device. The first and second coupling mechanisms 310, 320 are on opposite sides of the devices 110, 120 so as to form the S-shaped path. For example, in the tablet mode with the screens 160, 170 both on a top surface in the same plane, one of the coupling mechanisms 310 is on a back side of the device 110 and the other coupling mechanism 320 is on a front side of the opposing device 120. A tightening mechanism 360 coupled to the coupling mechanism 310 can be used to maintain a selected tension in the first flexible connection member 330. The tightening mechanism 360 can be either a push or pull arrangement. In some embodiments, the tightening mechanism can be spring-based, while in other embodiments the tightening mechanism can include a screw that when turned increases the tension on the flexible connection member 330. The tightening mechanism 360 can be coupled to either coupling mechanism 310, 320, although it is shown on the back surface of the first display device 110. Moreover, additional tightening mechanisms can be used, such as one attached to coupling mechanism 320. The flexible connection member 330, can be any of a variety of different materials including a cable, a wire, a conductor, a belt, an optical fiber, a chain, etc. In some embodiments, the flexible connection member 330 can be a communications path so that electrical signals (e.g., power or data) can be passed between the devices. For example, a cable, wire, conductor, or an optical fiber can be used to transmit power and/or data between devices. Other materials, such as a chain or belt can provide different advantages in terms or strength or flexibility. The coupling mechanisms can be a hinge lug or any other mechanical device that can be physically attached to the display device and receive the flexible connection member 330. The benefit of the hinge 130 is that by connecting the flexible connection member 330 to one side of one of the display devices and to the opposite side of the opposing display device, a low-cost hinge mechanism is formed between the two ends of the display devices that provides increased stability over devices that attach cables to a same side of both devices. With this arrangement, the connection member 330 pulls the two devices 110, 120 together.

Figure 4:
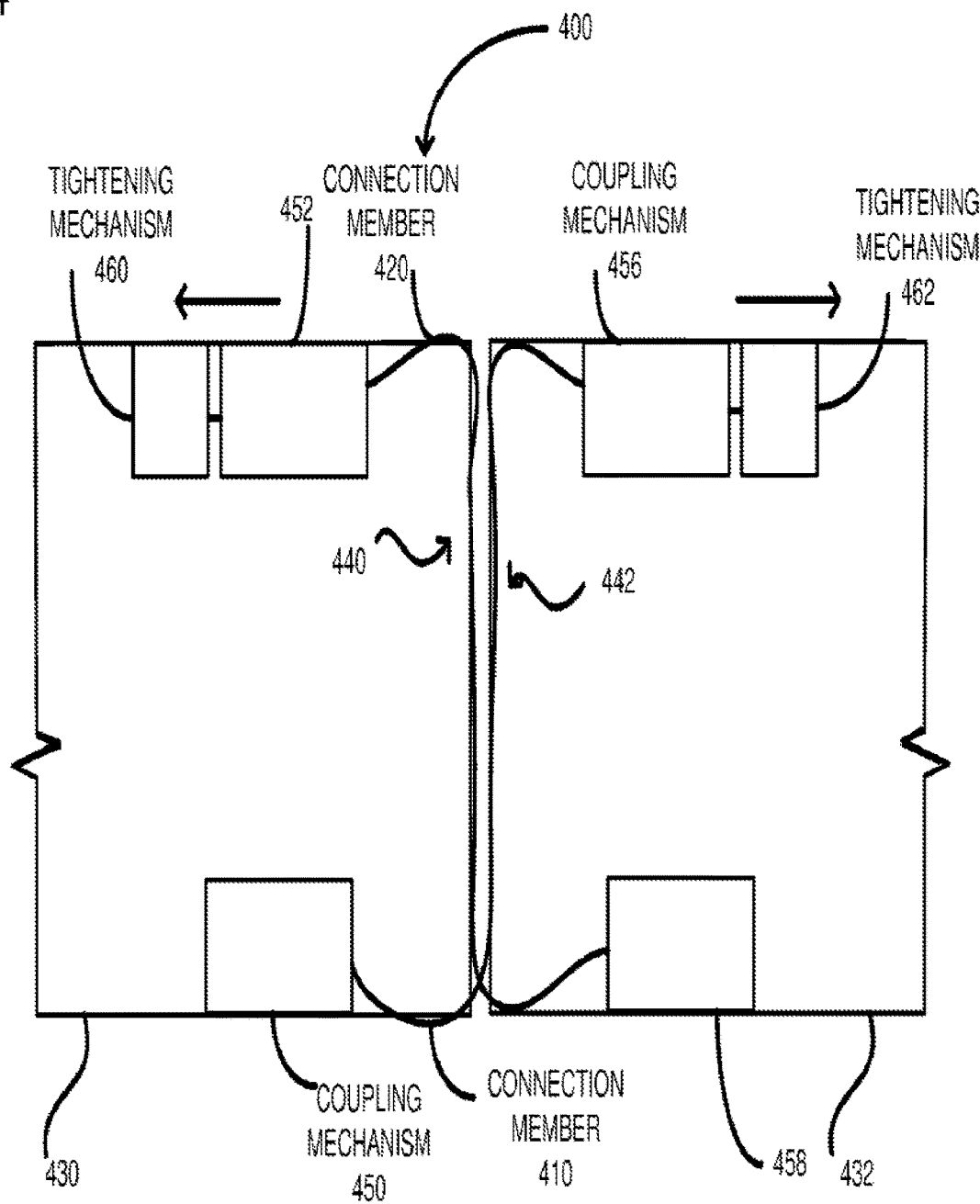
FIG. 4 is an embodiment of a hinge having two flexible connection members, one following an S-shaped path, and a second having a mirrored S-shaped path to create a cross-configuration between the flexible connection members and further including two tightening mechanisms to tighten the flexible connection members.

FIG. 4 shows a side elevational view of a hinge 400 according to another embodiment wherein two flexible connection members 410, 420 are used in a cross-configuration. In this embodiment, a first device 430 is coupled to a second device 432 end-to-end so that ends 440 and 442 are positioned adjacent one another. The connection member 410 is substantially S-shaped, while the connection member 420 is substantially a mirrored S-shape. The connection members 410, 420 cross each other as they pass between the ends 440, 442 of the devices 430, 432. Device 410 has a coupling mechanism 450 fixedly mounted on a back of the device 430 and a coupling mechanism 452 fixedly mounted on a front face of the device. Likewise, device 432 has coupling mechanisms 456, 458 on front and back surfaces, respectively. The connection member 410 is coupled to the coupling mechanism 450 on the back side of device 430, and to the coupling mechanism 456 on the front side of device 432. Similarly, connection member 420 is connected at one end to coupling mechanism 452 on a front side of device 430 and to coupling mechanism 458 on a back side of device 432. Each flexible connection member 410, 420 is coupled to a respective tightening mechanism 460, 462. The tightening mechanisms 460, 462 can be used to increase tension on the connection members 410, 420 after assembly of the device. The cross configuration of the hinge 400 forces the ends 440, 442 to stay closely bound together while allowing the devices 430, 432 to rotate through a full 360 degrees with respect to one another, as was described in FIGS. 2A-2E.

Figure 5:
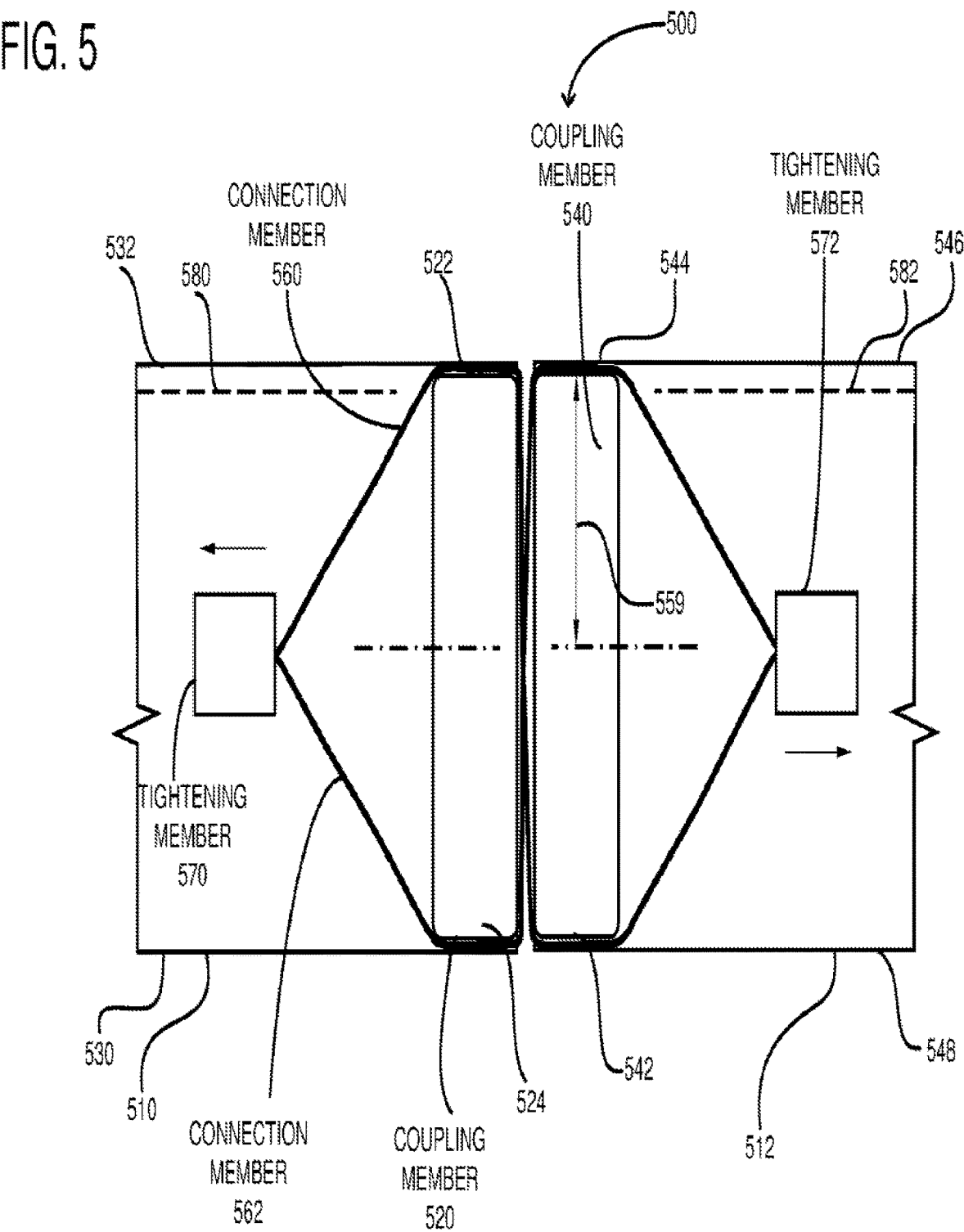
FIG. 5 is an embodiment of a hinge showing coupling members that create a bend and a reverse bend in a flexible connection member.

FIG. 5 shows a side elevational view of a hinge 500 according to another embodiment. In this embodiment, a first device 510 is coupled to a second device 512 by the hinge 500. The first device 510 has a coupling member 520 with top and bottom sections 522, 524 adjacent to bottom and top faces 530, 532 of the device. The second device 512 includes a coupling member 540 having bottom and top sections 542, 544 adjacent to top and bottom faces 546, 548. How close the coupling member 540 is to the faces depends on a width 559 of the coupling member 540 from a middle of the device 512. The width 559 can be selected so that the hinge 500 does not protrude beyond the faces when the devices 510, 512 are rotated relative to each other. Coupling member 520 is generally sized equally to coupling member 540. A connection member 560 passes over the top section 522 of the coupling member 520 to form a bend and under a bottom section 542 of the coupling member 540 to form a reverse bend. The overall shape of connection member is a mirrored S-shape. A connection member 562 is similarly coupled in a mirrored S-shape path. The connection members 560, 562 are both coupled to a same tightening member 570 at one end and at an opposite end to a same tightening member 572. The tightening members 570, 572 can be moved in the direction shown by arrows adjacent thereto so as to increase tension on the connection members 560, 562. The tightening members 570, 572 can be wire termination devices that are e.g. injection molded with the connection members embedded therein. One tightening member can be sufficient. However, if two are used, tightening distance per tightening member can be halved so as to conserve space inside devices 510, 512. FIG. 5 also shows screen displays 580, 582 on the top faces 532, 546 of the devices. The screen displays 580, 582 are aligned in a same plane to as to provide an appearance of one larger screen in a tablet mode.

Figure 6:
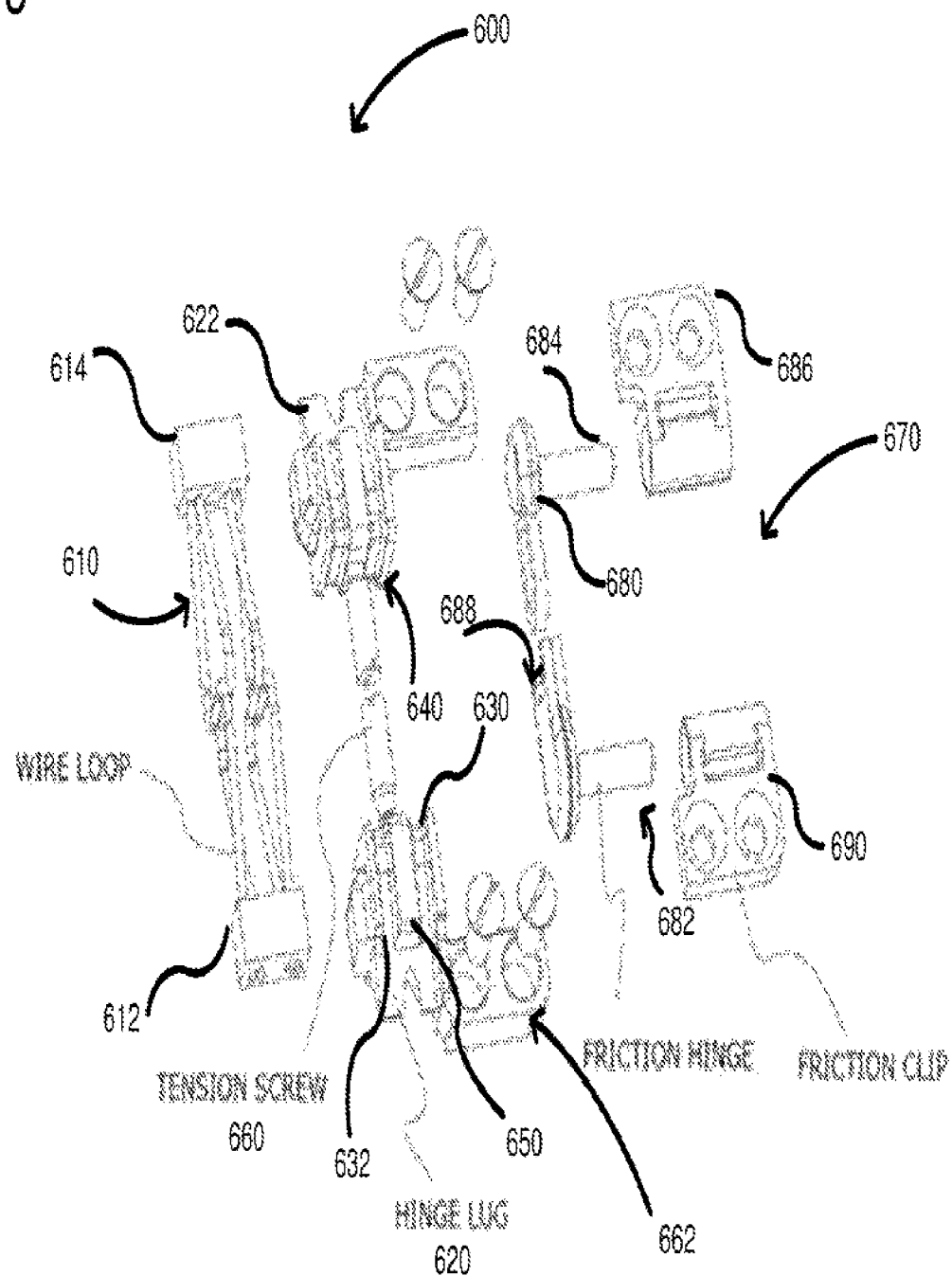
FIG. 6 is an assembly drawing of an embodiment with the flexible connection members as S-shaped wires, with a male/female friction hinge so as to allow free stops in any position through 360 degrees.

FIG. 6 shows an assembly drawing of an embodiment of a hinge 600 that can be used for coupling devices together. In this embodiment, four wires 610 (two wire loop pairs) are used as the flexible connection members. The wires 610 are coupled between two wire termination blocks 612, 614. Each of the four wires 610 has either a substantially S-shape or a mirrored S-shape. An S-shape and mirrored S-shape loop with ends coupled in the wire termination blocks creates a substantially figure-eight shape. The wires 610 are mounted onto the coupling members, which in this case is a hinge lug 620 and an opposed hinge lug 622. The hinge lug 620 has two downward-sloping channels 630, 632, each one to accommodate one of the wires in a wire loop. As shown at 640, the channels come to a peak of the slope and then follow an outer perimeter of the hinge lug to extend along a hinge lug end, and then wrap around the bottom of the hinge lug. A channel divider 650 divides the channels 630, 632 to keep the wire loops in place. A tension screw 660 is threaded through a hole that passes through the hinge lug. The hinge lug 620 is coupled to a mounting plate 662 having holes for receiving screws to mount the hinge lug 620 to a face of the device. A friction hinge 670 is used to allow the devices to rotate with a free stop at any desired angle of rotation. The friction hinge 670 includes a rotatable male portion 680 having a cylindrical pin connector 684 that is coupled into a receptacle of a mounting bracket 686. A female portion 682 has a cavity therein for receiving the male portion so that they can be rotatably and slidably coupled together. The female portion 682 also includes a cylindrical connector to rotatably mount to a friction clip within a mounting bracket 690. Both mounting brackets 686 and 690 have holes for receiving mounting screws for mounting the brackets to the devices. The combination of the hinge 600 and friction hinge 670 allows two devices to be coupled together and rotate relative to each other through 360 degrees with a free stop in any position. With the free stop feature, a user can release the displays at any position and they will stay in that position.

Figure 7:
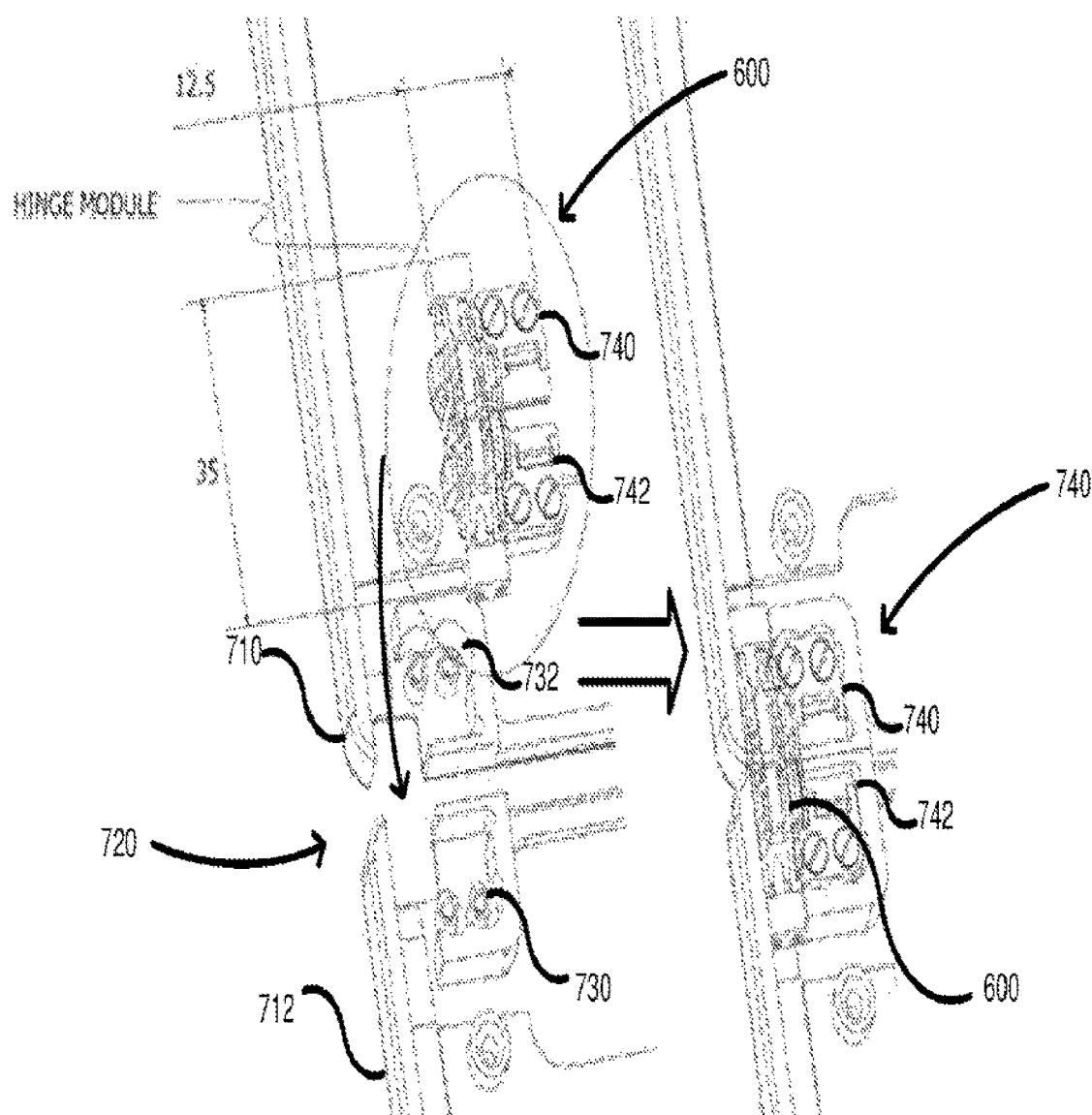
FIG. 7 shows the assembly of FIG. 6 assembled within the dual-display device.

FIG. 7 shows the hinge 600 of FIG. 6 assembled and ready to be mounted to first and second devices 710, 712. Each device 710, 712 has a respective cutout to form an opening 720 into which the assembled hinge 600 can sit. Threaded mounting holes 730, 732 can be used to receive screws located in mounting plates 740, 742 so as to couple both devices 710, 720 to the hinge 600. The hinge 600 mounted into the devices 710, 712 is shown at 740.

Figure 8:
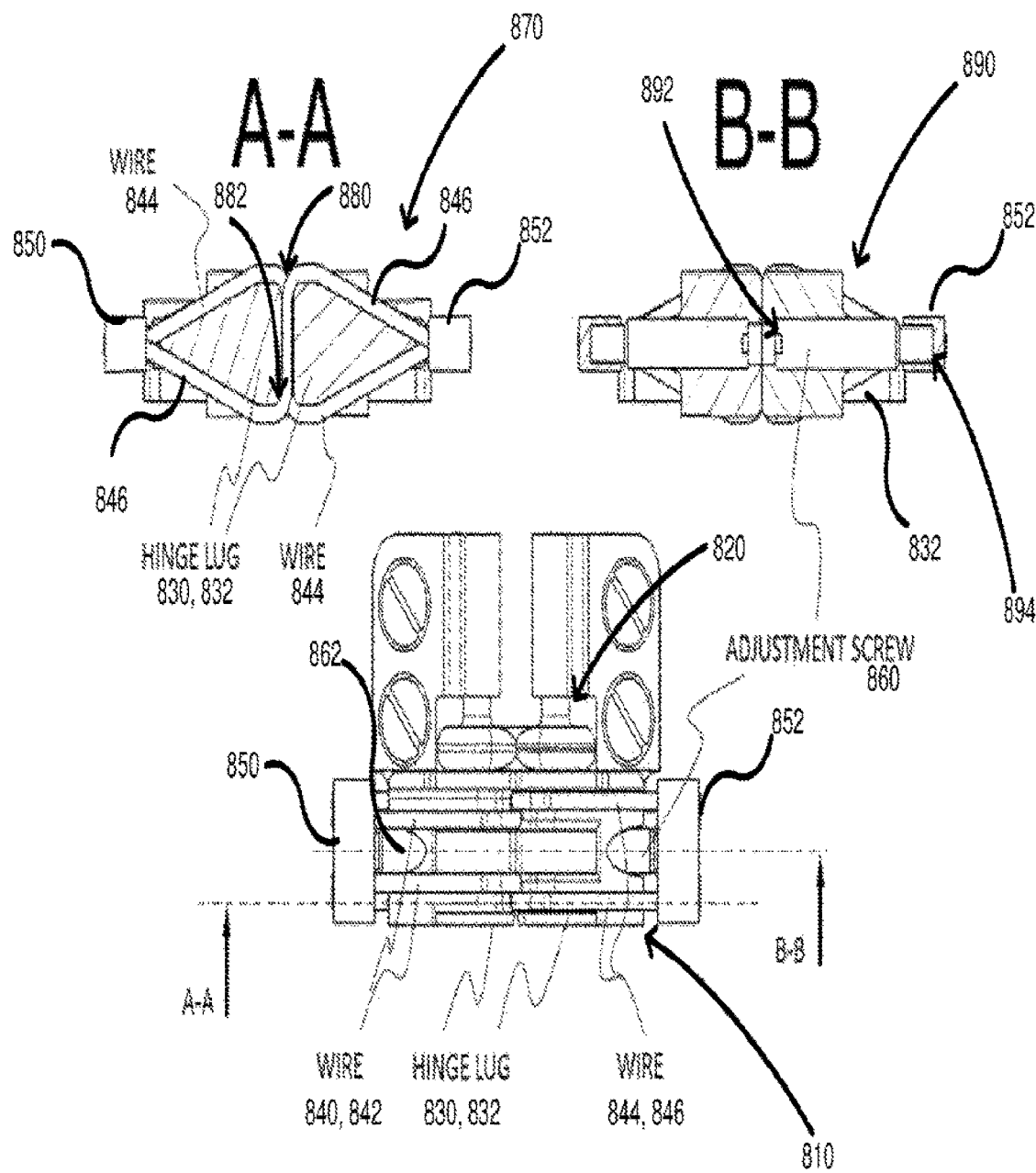
FIG. 8 shows a top view of the hinge with cross-sectional views along lines A-A and B-B.

FIG. 8 is a top-down view of an embodiment of a hinge assembly 810 allowing a 360 degree range of motion. A friction hinge 820 is positioned adjacent to the hinge assembly 810 and can allow a free stop (a holding action) at any point of rotation. The hinge assembly 810 includes two hinge lugs 830, 832 positioned end-to-end and held together with four wires 840, 842, 844, 846, coupled to termination devices 850, 852. The adjustment screws 860, 862 are threaded through the hinge lugs 830, 832 and press on the termination devices 850, 852 so as to increase tension in the wires 840, 842, 844, 846. Turning either screw 860, 862 increases tension on all four wires due to the wires being coupled to both termination devices 850, 852. A cross-sectional view 870 is shown along lines A-A. The wire 846 follows a generally S-shaped path while the wire 844 follows a mirrored S-shape path. Together they form an elongated figure-eight shape or otherwise two back-to-back pear shapes. In either case, a closed-loop pattern is formed by the combination of two separate wires. The hinge lug 830 has a channel in which the wire 844 sits. The channel has a peak 880 that slopes downwardly as it approaches the termination device 850. Additionally, the channel extends down an end face of the hinge lug 830 before wrapping around an opposed peak 882 and sloping upwardly to the termination device 850. The peaks 880 and 882 can align with the front and back faces of the devices so as to ensure that the hinge does not extend beyond the faces when rotating. The opposed peaks 880, 882 are used to couple different wires 884, 846, respectively, and to form bends or reverse bends as the wires pass within the channel. Additionally, each wire passes from one termination device (e.g., 850) through part of the channel on one of the hinge lugs, between ends of the hinge lugs, into a channel on the opposed hinge lug, and finally to the termination device (e.g., 852) on the other device. The two hinge lugs 830, 832 thereby combine to provide a bend and reverse bend in the wires as the wires pass over the peaks of the hinge lugs. The wires terminate in a same horizontal plane within the termination devices 850, 852 so as to provide even tension on the wires.

A cross-sectional view 890 is shown along lines B-B. The adjustment screw 860 includes a head 892 that can be screwed when the hinge lug is bent to expose the screw. In this way, the tension on the wires can be increased after manufacture and at any time during the life of the devices by merely rotating (pivoting) the devices relative to each other at a sufficient angle to expose the screw head 892. FIG. 2E is an example configuration wherein the screw heads for each hinge lug are exposed. The screw 860 threads in a hole that extends through the hinge lug 832 and extends into a recess 894 of the termination device 852. Screwing of the screw 890 tightens multiple wires simultaneously and pulls the devices together with increased force.

Figure 9:
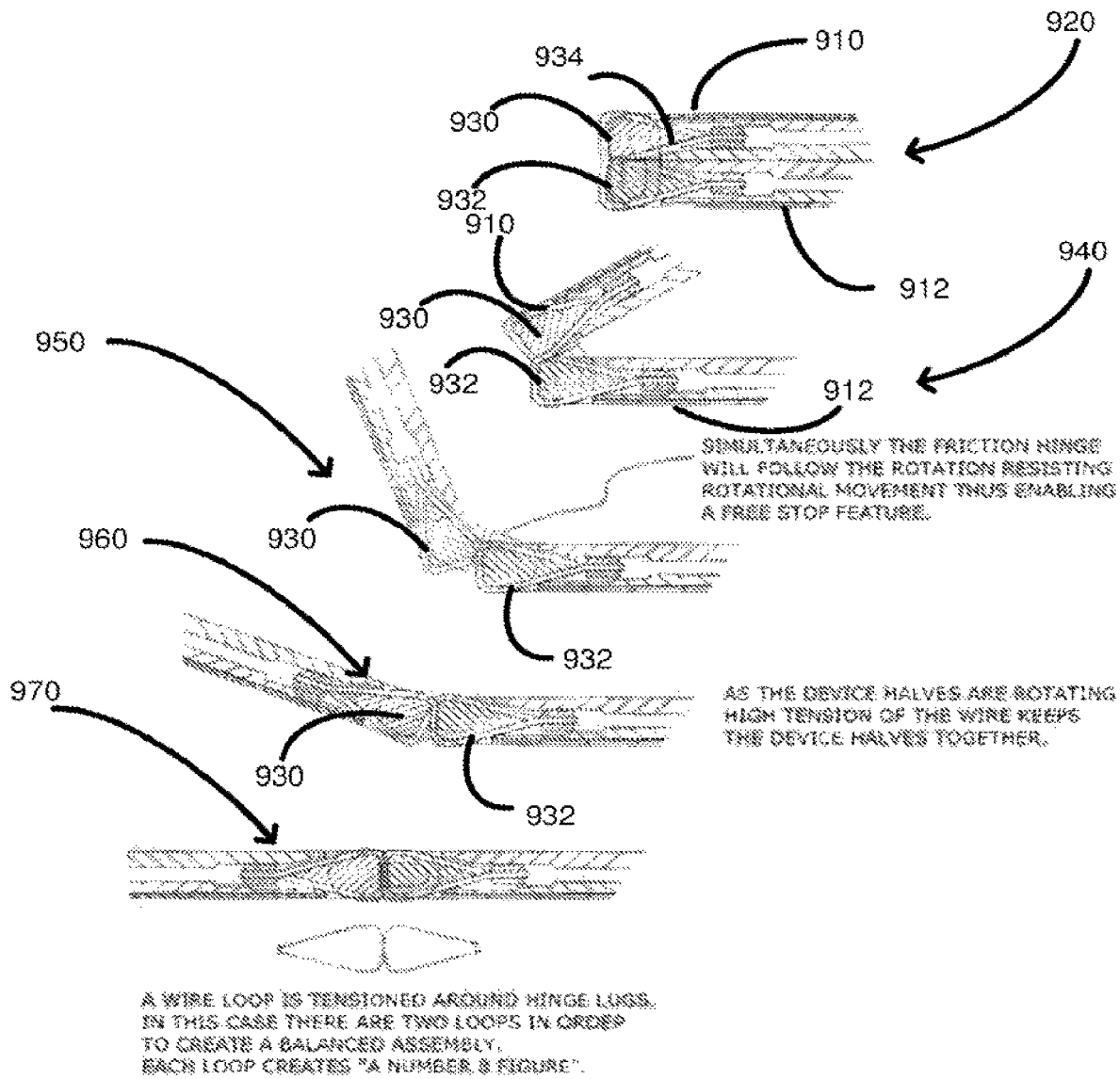
FIG. 9 shows a progression of how the flexible wire changes configuration as the dual-display device rotates from a closed position to a tablet position.

FIG. 9 shows a series of images with two devices in a closed position and opening to a tablet position and the relative positions of the hinge lugs and the friction hinge during the rotational movement between the devices. A first device 910 and a second device 912 are shown in a closed position at 920. In this position, a friction hinge has a male portion 930 and a female portion 932 that sit in a vertical position. The wires, such as wire 934, pass from one side of device 910 to an opposite side of device 912 and are bent around the hinge lugs, as already described. While the wires are bent, they are in more of a U-shape configuration. At 940, the device 910 rotates to create a 30 angle between it and the second device 932. At 950, the devices 930, 932 are at about a 100 degree angle. The flexible wire 934 bends as the rotation is occurring. If a user releases a grip on the devices, they will stay in the illustrated position due to the friction hinge. As illustrated at 960 as the devices continue to be opened, the device halves are rotating with high tension in the wire to keep the device halves together. Finally, at 970, the device is in a tablet position and the wires move into a substantially S-shaped configuration and mirrored S-shape configuration. Thus, the wires transformed configuration from a substantially U-shaped configuration to a substantially S-shaped configuration.

Figure 10:
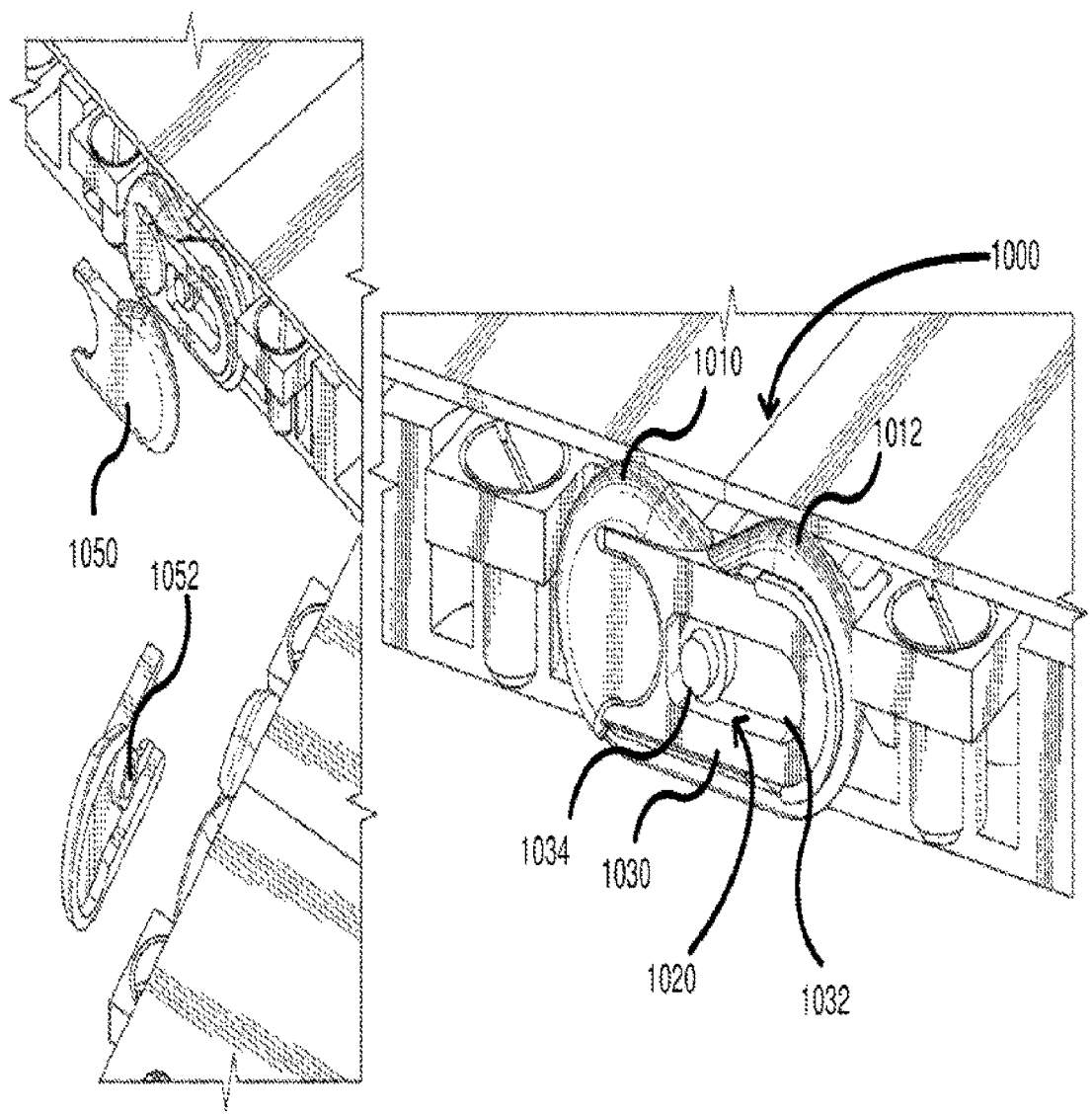
FIG. 10 shows a male and female friction hinge according to one embodiment allowing for free stop positions at various angles of rotation between the displays.

FIG. 10 shows an example of a hinge assembly 1000 including first and second friction hinges 1010 and 1012 coupled together through a geared connection, shown generally at 1020. Friction hinges are a term used in the art and are also called Constant Torque Hinge, Position Hinge, Clutch hinge, or Detent Hinge. The term friction hinge is meant to include any hinge wherein at least two devices can be rotated relative to each other with a free stop feature wherein a user can release the devices and due to the holding force of the friction hinges, the devices remain in their respective position. In general, friction hinges are used in laptop computers, for example.

The friction hinge 1010 is a male friction hinge having an elongated extension member 1030 with an elongated slot 1032 formed therein. The extension member is symmetrical on top and bottom. The female friction hinge 1012 includes a recess in which the extension member 1030 is positioned. The female friction hinge 1012 also includes a pin 1034 sized to fit within the elongated slot 1032. The pin 1034 and slot 1032 form a geared pin-and-slot joint to ensure that the male and female friction hinges 1010 and 1012 are coupled together while being able to cooperatively slide in a radial direction. More particularly, the pin 1034 and slot 1032 prevents the male and female friction hinges 1010, 1012 from separating. A cap member 1050 is snapped onto the top of the hinge assembly 1000 using the pin 1034 and a mating pin receptacle 1052. As described further below, the hinge assembly 1000 allows male and female friction hinges 1010, 1012 to be coordinately coupled so that they can rotate together in unison and can slide radially relative to each other so as to provide smooth rotational operation.

Figure 11:
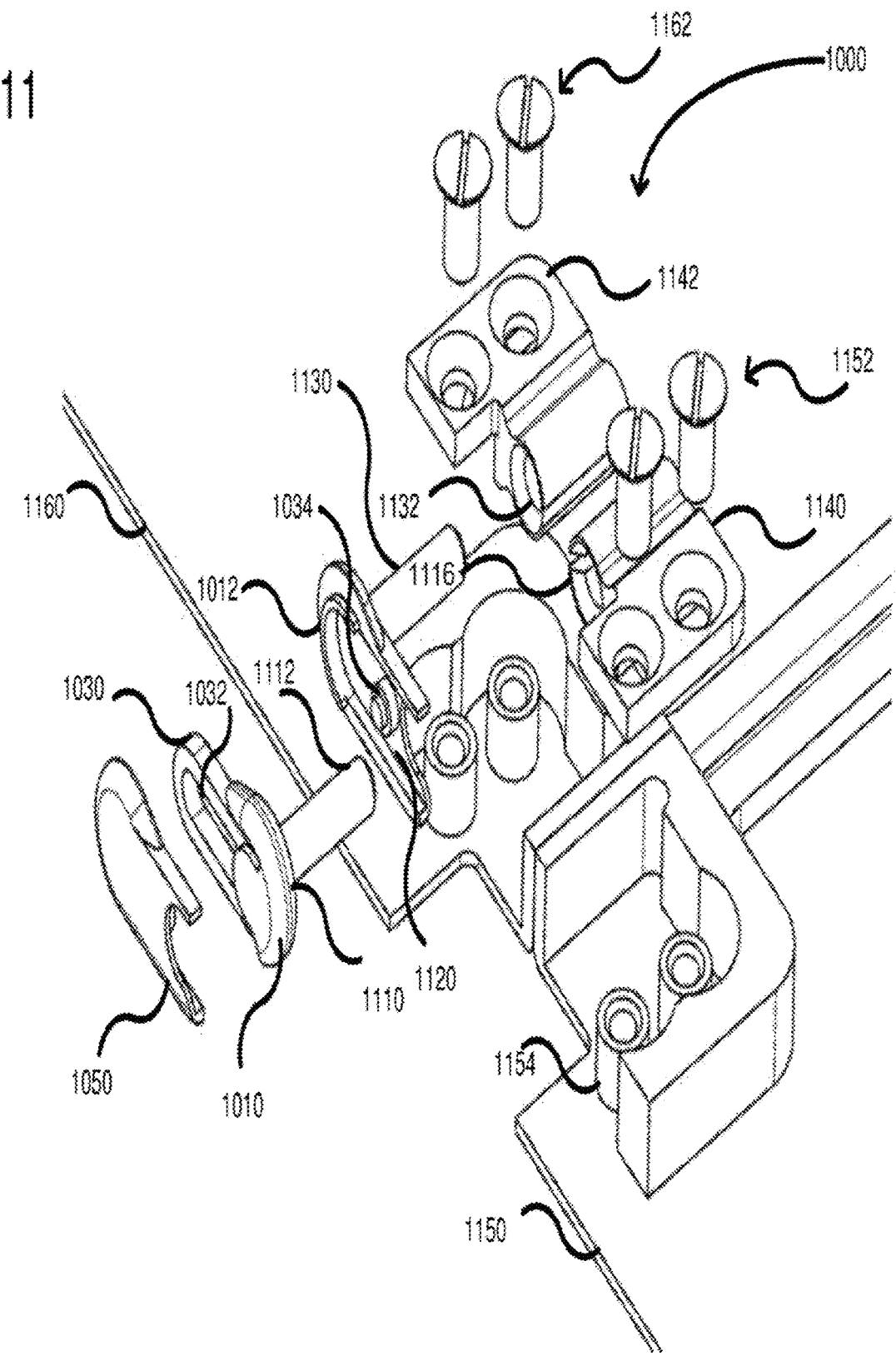
FIG. 11 shows an assembly drawing of the friction hinge of FIG. 10.

FIG. 11 shows an assembly drawing of the hinge assembly 1000. The male friction hinge 1010 includes a coupling portion 1110 that comprises the elongated extension member 1030 having the slot 1032 formed therein. The male friction hinge 1010 also includes a pin 1112 extending perpendicularly to the coupling portion 1110. The pin 1112 is sized to fit within a female receptacle 1116 with a friction fit to form a first axis of rotation. The female friction hinge 1012 has a coupling portion with a recess 1120 formed therein that is sized to fit the elongated extension member 1030 of the male friction hinge 1010. The female friction hinge 1012 also includes a pin 1130 that is sized to fit within a female receptacle 1132 with a friction fit to form a second axis of rotation. The female receptacles 1116, 1132 are shown as a slotted clip, but other types of female receptacles can be used such as a friction disk, a "question-mark" band, a roll pin, a tapered shaft, etc. The female receptacle 1116 is coupled to a mounting plate 1140, which mounts to a device 1150 using screws 1152 and mounting holes 1154 located on the device. The female friction hinge 1012 also includes a mounting plate 1142 that mounts to the other device 1160 using screws 1162. Both pins 1112, 1130 rotate within the female receptacles 1116, 1132 to create two axes of rotation. However, because the coupling portion 1110 of the male friction hinge is coupled within the recess 1120 of the female friction hinge 1012, the two axes of rotation about pins 1112, 1130 are rotated in unison through the mutual gearing between the friction hinges 1010, 1012. Additionally, due to the mutual gearing, there is a level of load sharing between the friction hinges to provide additional ability to free stop the devices 1150, 1160 as they are rotated relative to one another. Still further, the female and male friction hinges 1010, 1012 cooperatively slide in a radial direction towards and away from each other as the devices 1150, 1160 rotate relative to each other.

Figure 12:
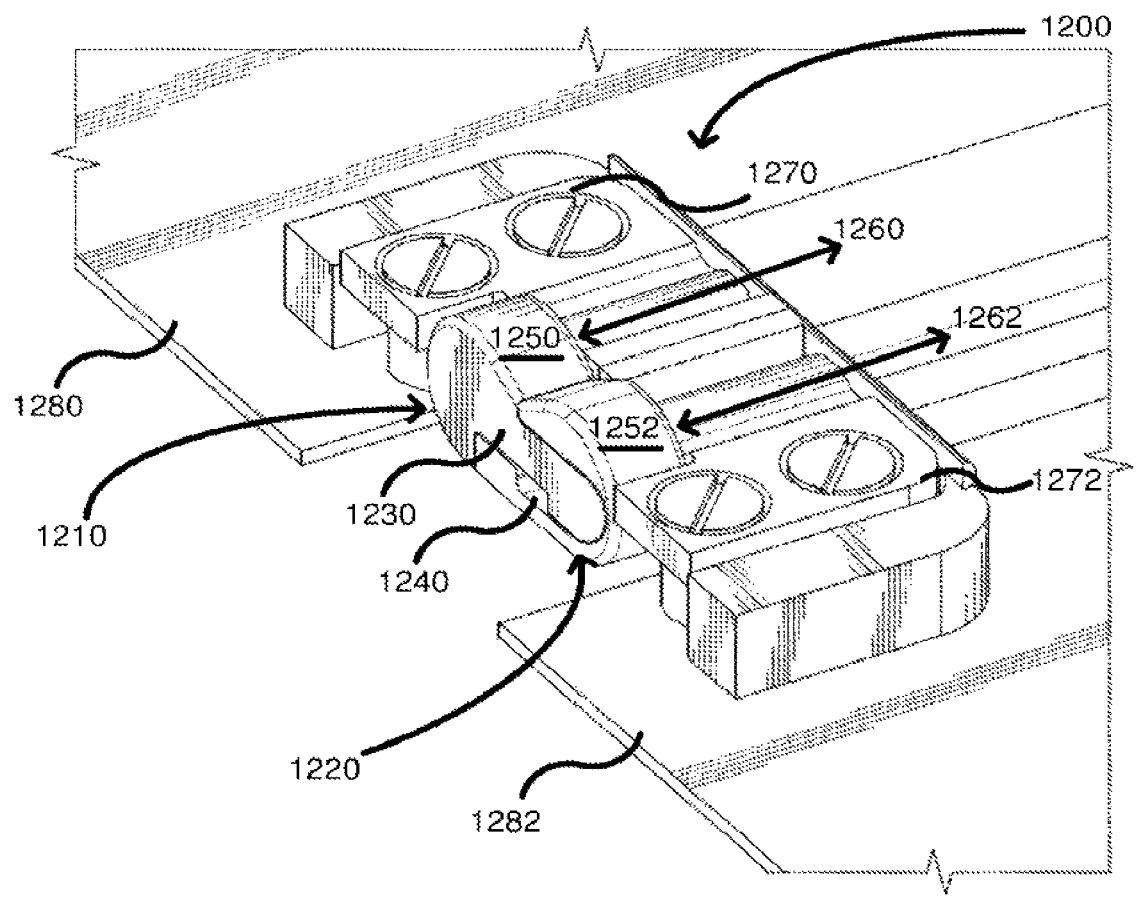
FIG. 12 shows the friction hinge assembled to couple together devices according to another embodiment.

FIG. 12 shows a hinge assembly 1200 according to another embodiment. In this embodiment, there are two friction hinges 1210, 1220 that are coupled together through a geared cooperation so that they rotate in unison. The friction hinge 1210 is a male friction hinge having an elongated extension member 1230 that extends within a recess 1240 of the female friction hinge 1220. The elongated extension member 1230 can slide in a radial direction so that coupling portions 1250, 1252 move towards and away from each other as they rotate in unison. The friction hinges 1210, 1220 rotate on axes 1260, 1262 due to pins (not shown) extending perpendicularly to the coupling portions 1250, 1252. The friction hinges 1210, 1220 also include mounting plates 1270, 1272 for securing the friction hinges to devices 1280, 1282 that rotate relative to each other and that can be stopped at any rotational position due to the cooperative holding force generated by the friction hinges 1210, 1220 and the cooperative nature of the coupling portions 1250, 1252. For example, holding forces generated by one of the friction hinges can be passed to the other friction hinge through the male/female connection 1230, 1240.

Figure 13:
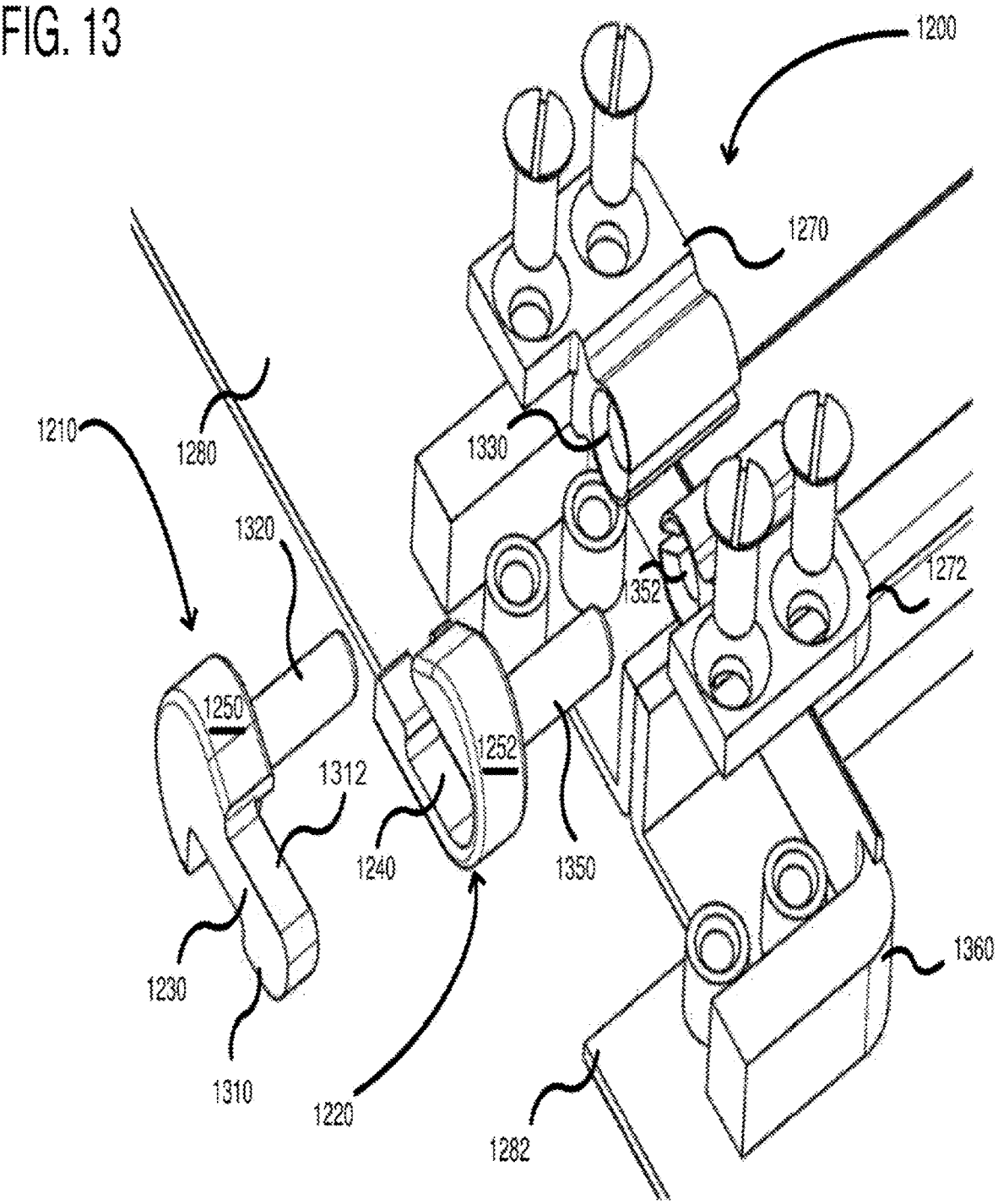
FIG. 13 shows an assembly drawing of a friction hinge of FIG. 12.

FIG. 13 is an assembly diagram of the hinge assembly 1200. The friction hinge 1210 includes the coupling portion 1250 including the elongated extension member 1230. In this case, the elongated extension member 1230 includes a keyed bottom end 1310 and a smooth top portion 1312. As a result, a top portion 1312 of the elongated extension member 1230 can be asymmetrical with the keyed bottom portion. The friction hinge 1210 further includes a pin 1320 extending along a rotational axis and perpendicular to the coupling portion 1250. For mounting to the device 1280, the frictional hinge further includes the mounting plate 1270, which includes a female receptacle 1330 therein sized for receiving the pin 1320 with a friction fit. In this case, the female receptacle is a slotted clip that exerts a force on the pin 1320 due to the pin being slightly larger than the female receptacle. Other types of female receptacles can be used as outlined above.

The female friction hinge 1220 includes the coupling portion 1252, which has a recess 1240 therein sized so that the elongate extension member 1230 fits within the recess 1240 with a friction fit. In this way, rotation of the coupling portion 1252 can generate a force on the side walls 1310, 1312 to transfer rotational force between the coupling members 1250, 1252. The female friction hinge 1220 also includes a pin 1350 that is positioned within a female receptacle 1352 of the mounting plate 1272. The mounting plate 1272 is coupled to the device 1282 using a bracket 1360 having threaded holes for receiving screws, which extend through the mounting plate 1272.

Although two coupling methods are shown in FIGS. 10-13 for coupling together the friction hinges, there are a variety of configurations that can be used. The friction hinges can be coupled so as to have a friction fit there between. Typically, such a friction fit can be accomplished with a male/female connection, but other connection techniques can be used. A geared coupling can be used to ensure that rotational energy is transferred between the first friction hinge and the second friction hinge. Additionally, it is desirable that the connection is such that the frictional hinges can move towards and away from each other to ensure smooth rotation of the devices.

Figure 14A:
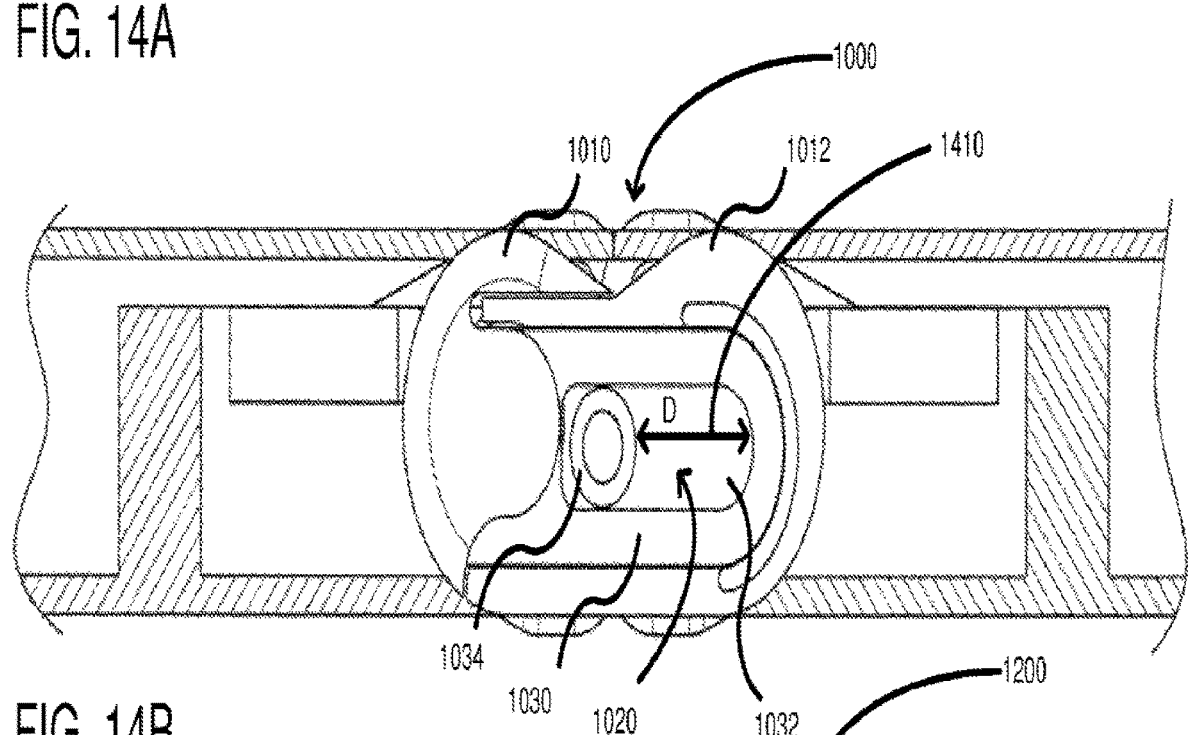
FIGS. 14A and 14B show different embodiments of the friction hinges of FIGS. 10 and 12.
Figure 14B:
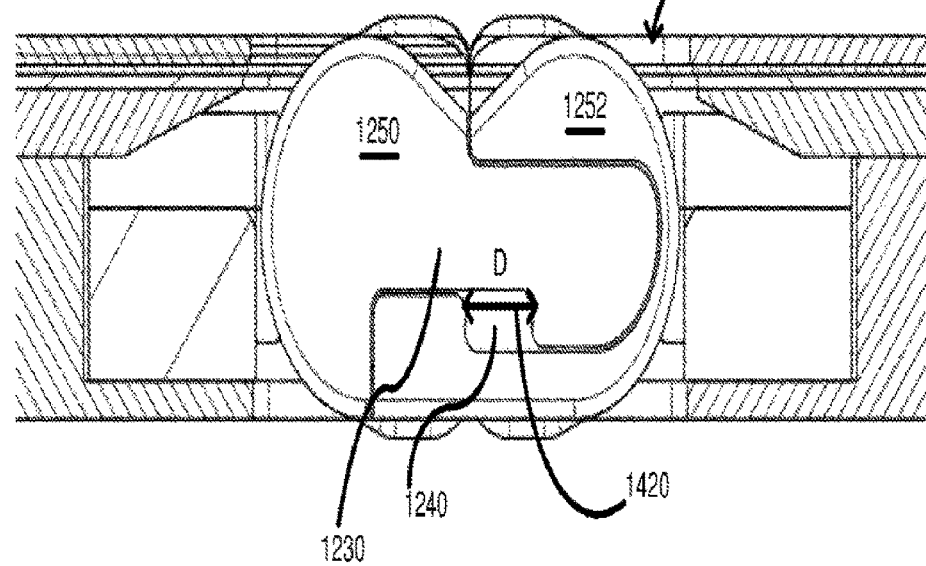

FIG. 14 shows cross-sectional views of two coupling techniques for the friction hinges. In a first coupling technique shown at 1000, a first friction hinge 1010 is rotationally coupled to a second friction hinge 1012 so that they rotate in unison. The geared connection 1020 is designed to allow radial movement of the friction hinges with respect to each other. For example, the elongated slot 1032 can allow radial movement of the frictional hinges 1010, 1012 a distance "D", as indicated at 1410. The pin 1034 ensures that the frictional hinges move along a predefined line and ensures that the hinges do not decouple.

In the second coupling technique shown at 1200, the first and second coupling portions 1250, 1252 are coupled together through a keyed elongated extension member 1230. The recess 1240 is sized so as to allow radial movement of the frictional hinges a distance "D", as indicated at 1420.

Figure 15:
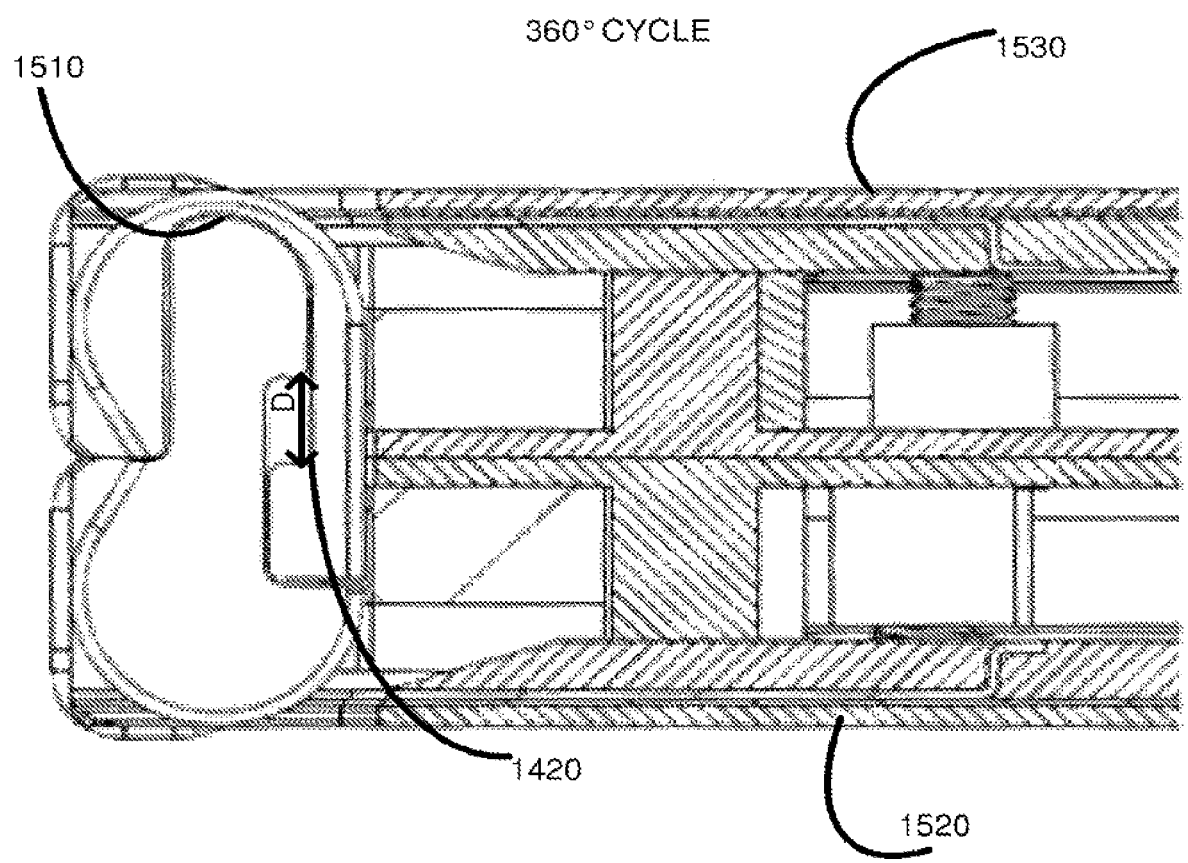
FIG. 15 shows an embodiment of a friction hinge with the devices in a closed position.
Figure 16:
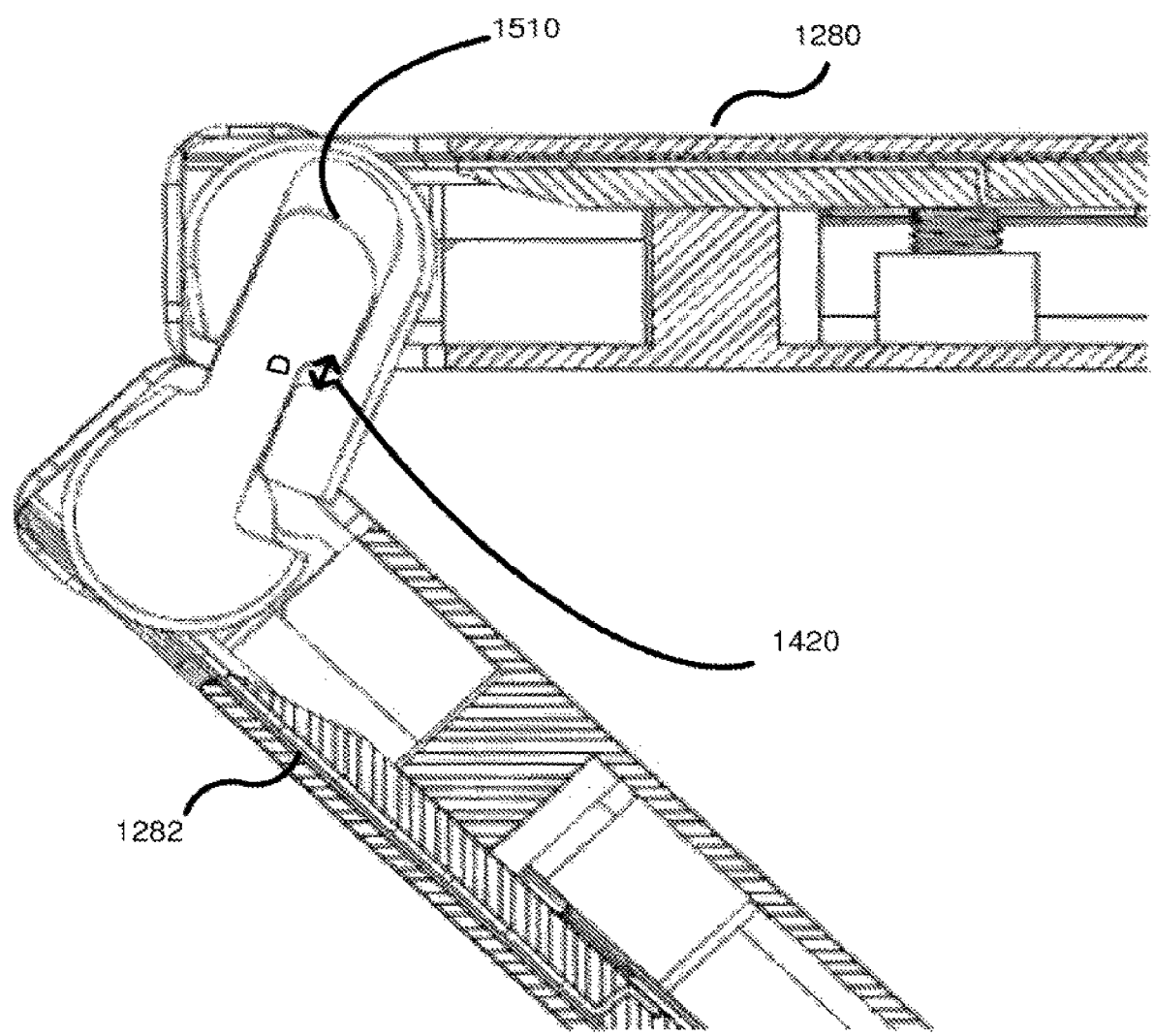
FIG. 16 shows the friction hinge of FIG. 15 with about an angle of 30 degrees between the devices.
Figure 17:
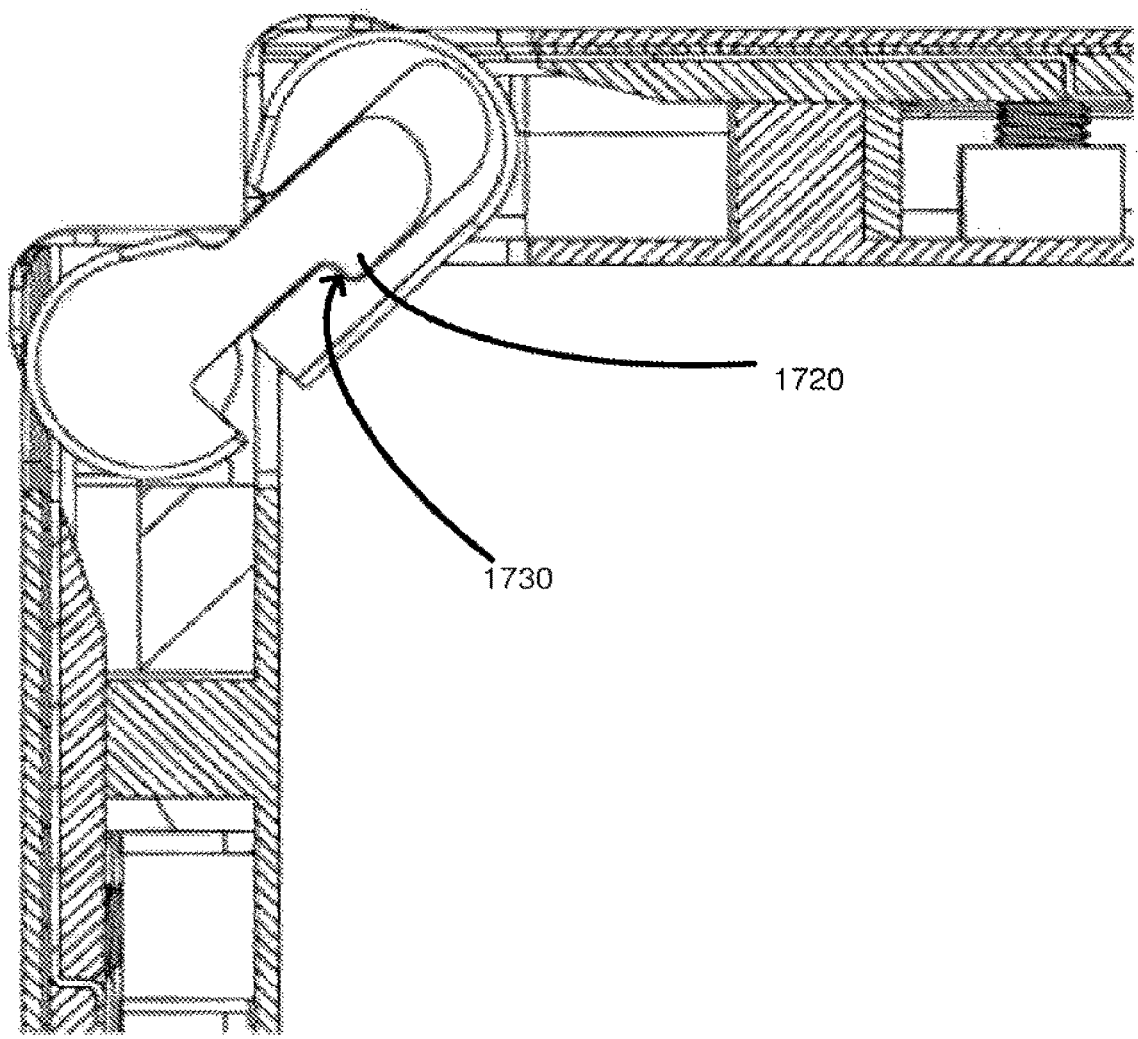
FIG. 17 shows the friction hinge of FIG. 15 with about an angle of 90 degrees between the devices.
Figure 18:
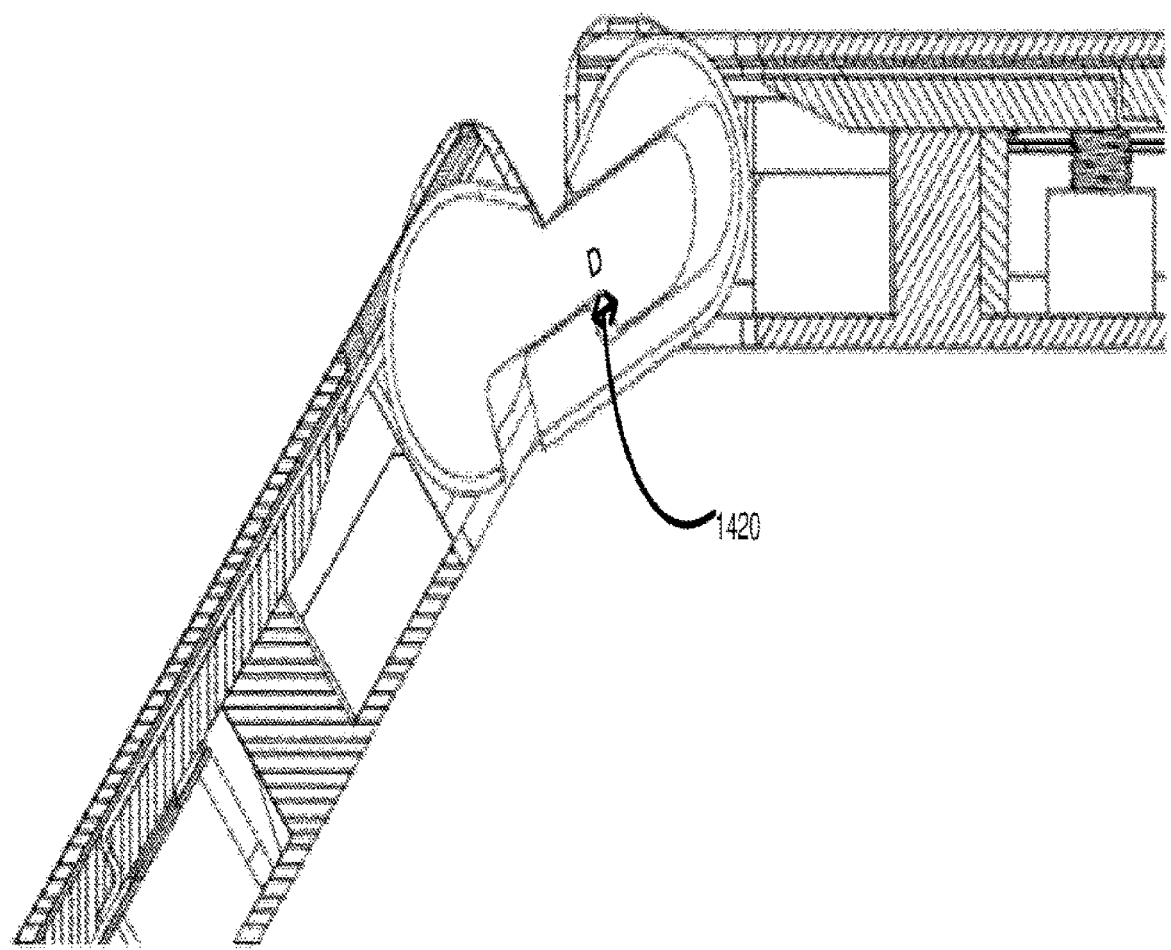
FIG. 18 shows the friction hinge of FIG. 15 with about an angle of 160 degrees between the devices.
Figure 19:
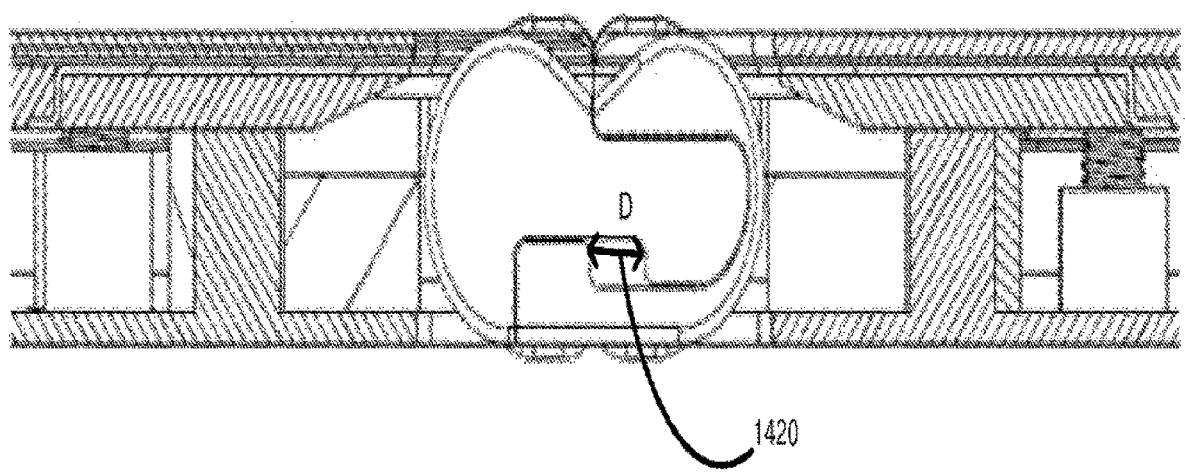
FIG. 19 shows the friction hinge of FIG. 15 with about an angle of 180 degrees between the devices.
Figure 20:
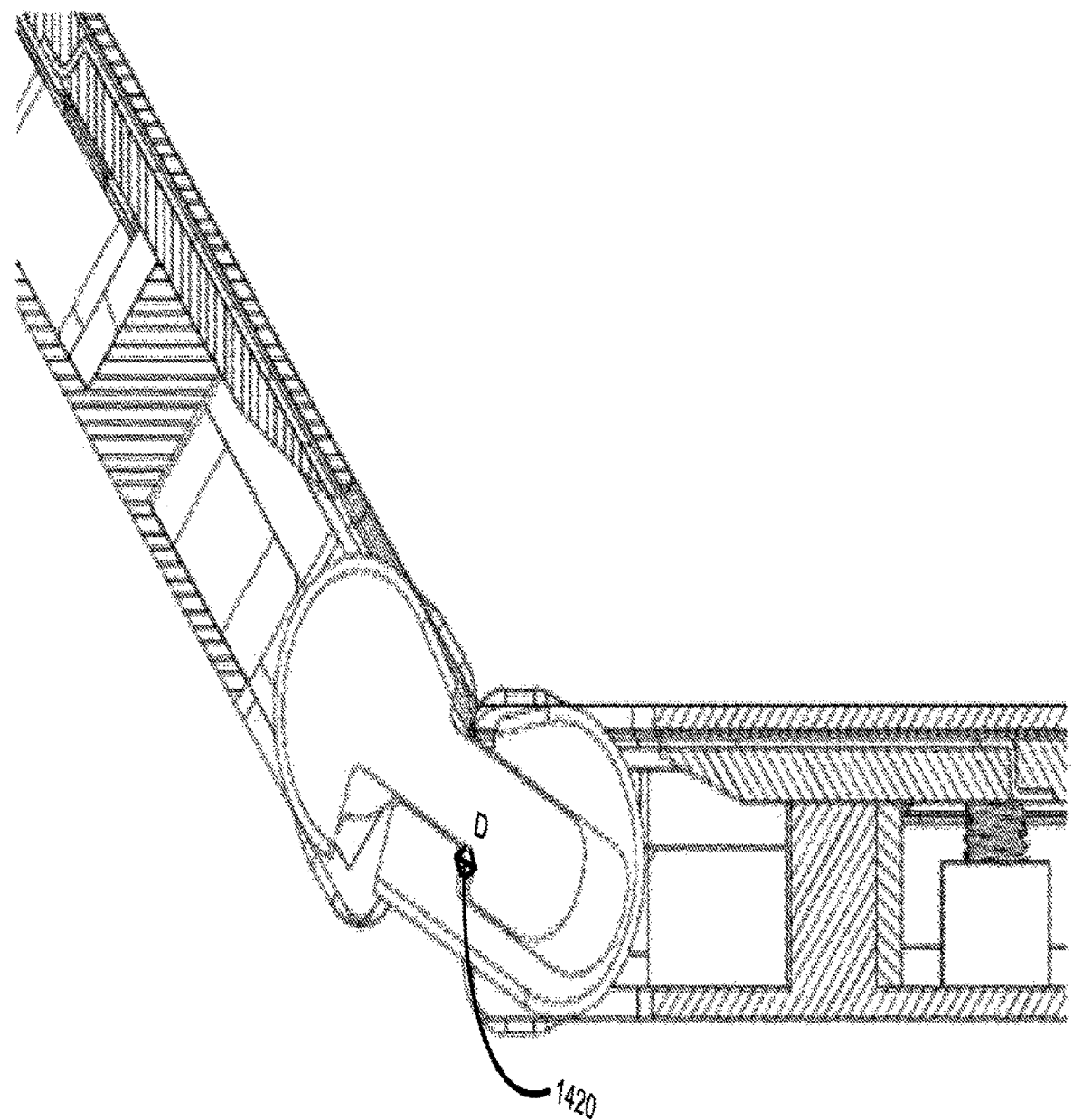
FIG. 20 shows the friction hinge of FIG. 15 with about an angle of 200 degrees between the devices.
Figure 21:
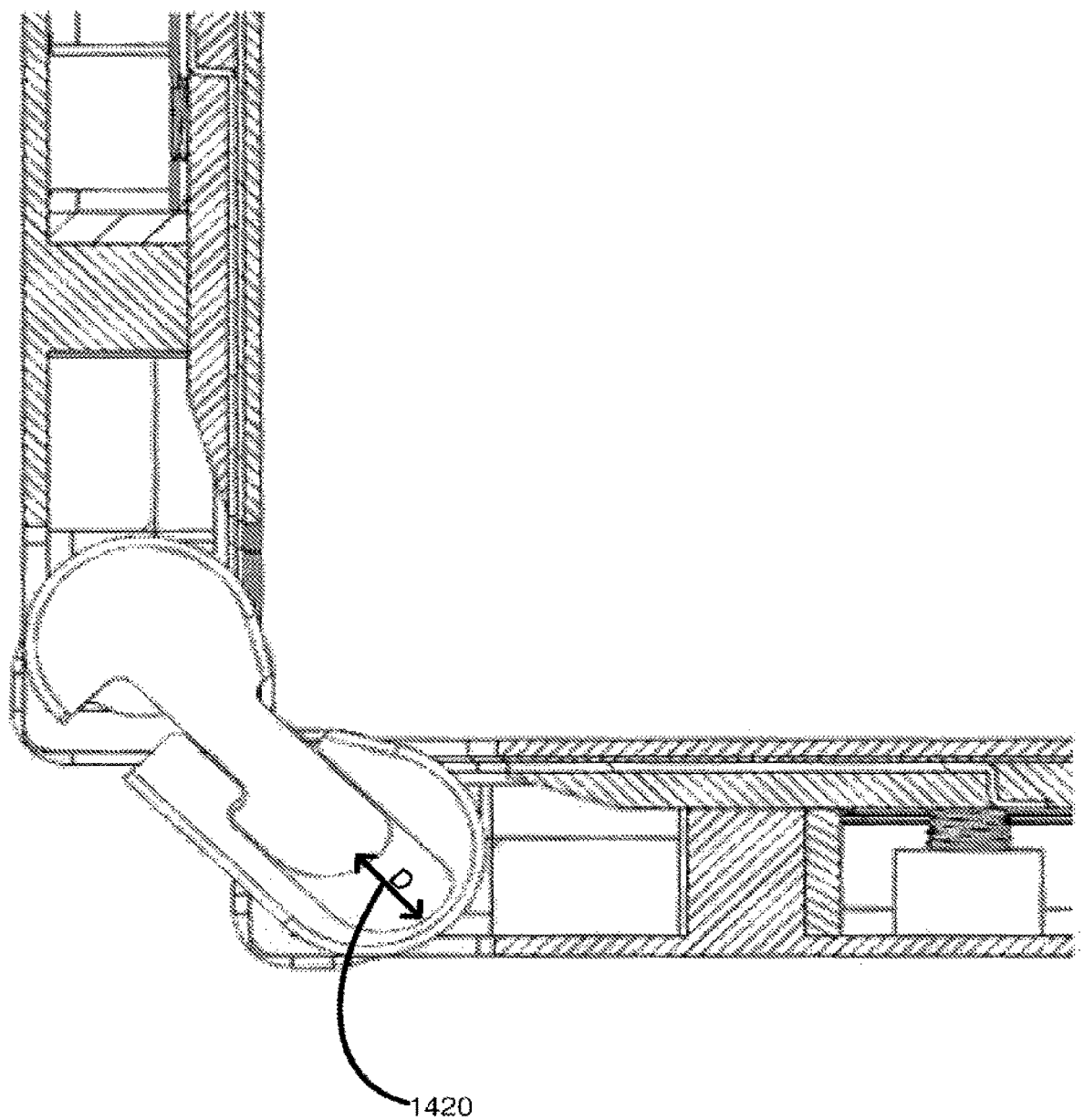
FIG. 21 shows the friction hinge of FIG. 15 with about an angle of 270 degrees between the devices.
Figure 22:
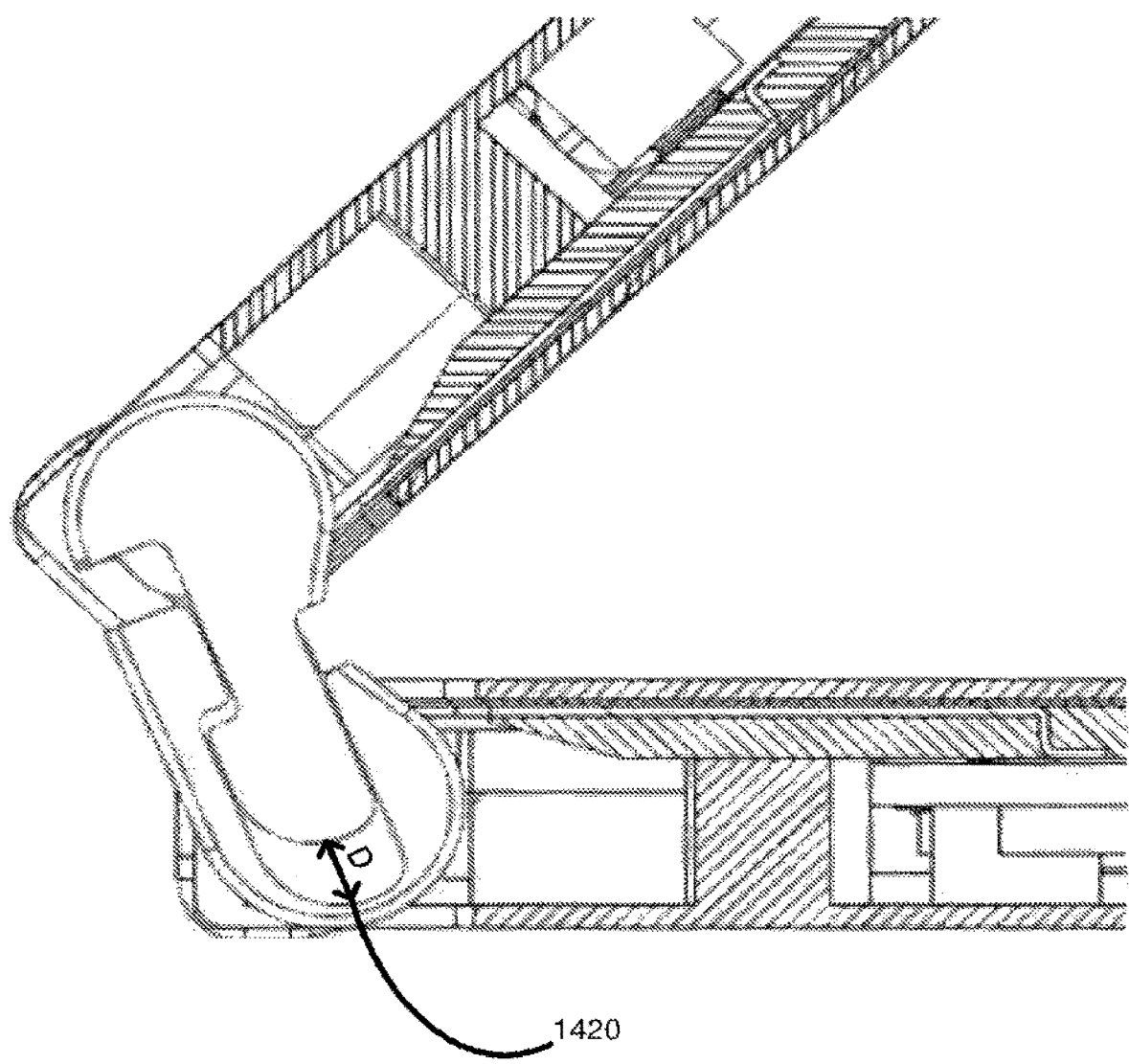
FIG. 22 shows the friction hinge of FIG. 15 with about an angle of 320 degrees between the devices.
Figure 23:
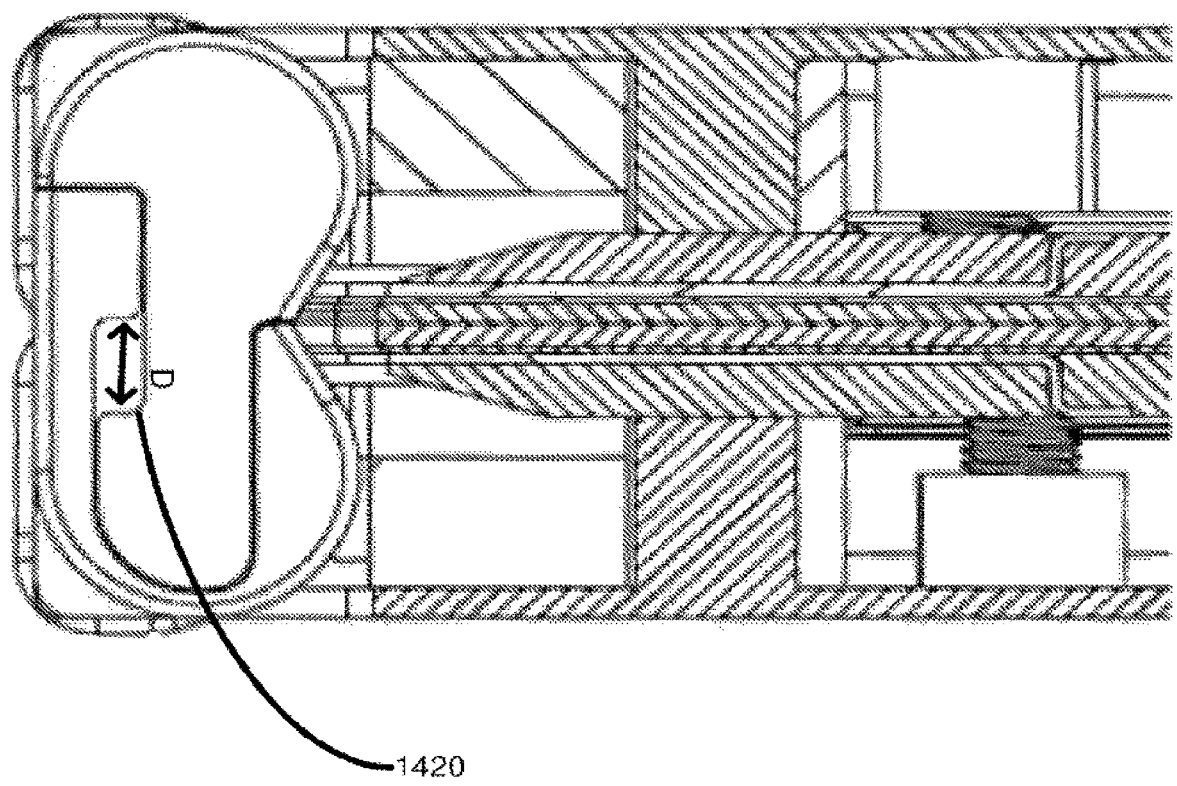
FIG. 23 shows the friction hinge of FIG. 15 with about an angle of 360 degrees between the devices.

FIGS. 15 through 23 show a progression of the frictional hinges as they move through a 360 degree cycle. In FIG. 15, the distance D shown at 1420 is at its maximum and the elongate extension member's end point 1510 is positioned at the end of the recess. At this point, the devices are in a fully open position with display surfaces 1520, 1530 outwardly positioned. FIG. 16 shows the frictional hinges as the devices 1280, 1282 are opened to about 30 degrees. Due to the dual friction hinges, the device 1280 can be held while releasing device 1282 and device 1282 will remain at its current position. FIG. 17 shows the devices 1280, 1282 at a 90 degree angle relative to each other. The distance D from the previous figures has gone to a distance of zero and a keyed end 1720 is abutting an end wall of a notch in the recess, as shown at 1730. The notch acts like a stop in this case to prevent separation of the friction hinges. Additionally, the end wall prevents further radial motion and ensures that the friction hinges do not separate. FIG. 18 shows that as the devices approach 180 degrees, the distance D, shown at 1420 increases with respect to FIG. 17. FIG. 19 shows the devices at 180 degrees with the distance D at its maximum. FIG. 20 shows that as the devices approach 270 degrees of rotation, the keyed elongate member continues to move within the recess. FIG. 21 again shows the elongate member such that it restricts any further separation between the hinges due to the keyed end, as described above. The distance D, which represents a radial movement of the friction hinges with respect to each other, dynamically changes as the devices are rotated. Finally, FIGS. 22 and 23 show about 300 degrees and 360 degrees respectively. FIG. 23 shows the devices in the closed position with the screens being not viewable.

Figure 24:
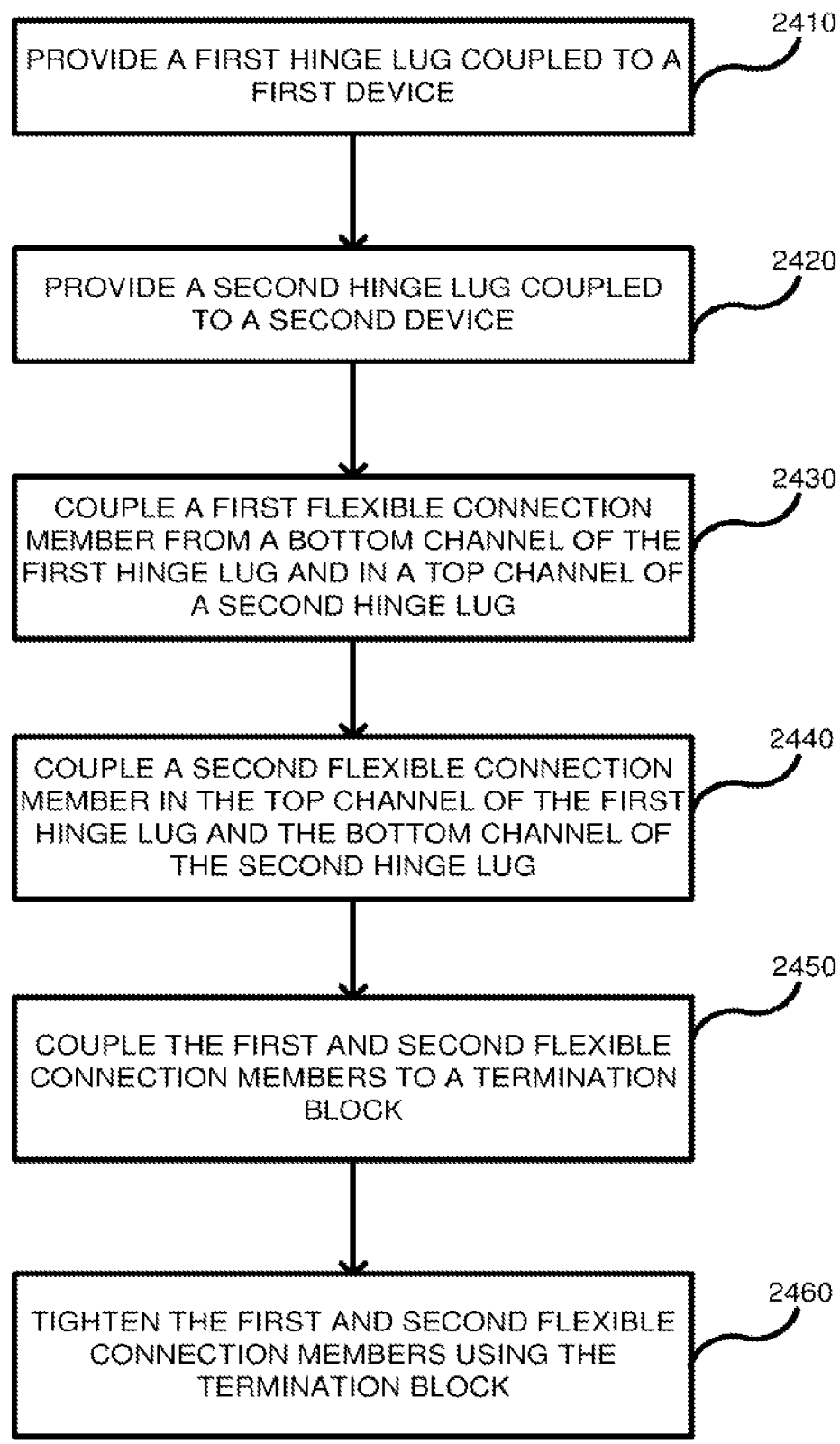
FIG. 24 is a flowchart of a method for coupling and tightening a hinge according to one embodiment.

FIG. 24 is a flowchart of a method according to one embodiment for connecting first and second devices. In process block 2410, a first hinge lug is coupled to the first device. In process block 2420, a second hinge lug is coupled to a second device. In process block 2430, a first flexible connection member is coupled from a bottom channel of the first hinge lug to a top channel of the second hinge lug. In process block 2440, a second flexible connection member is coupled in the top channel of the first hinge lug and the bottom channel of the second hinge lug, so that the first and second flexible connection members are in a cross configuration. In process block 2450, the first and second flexible connection members are coupled to a termination block.

And finally, in process block 2460, the first and second flexible connection members are tightened using the termination block.

Figure 25:
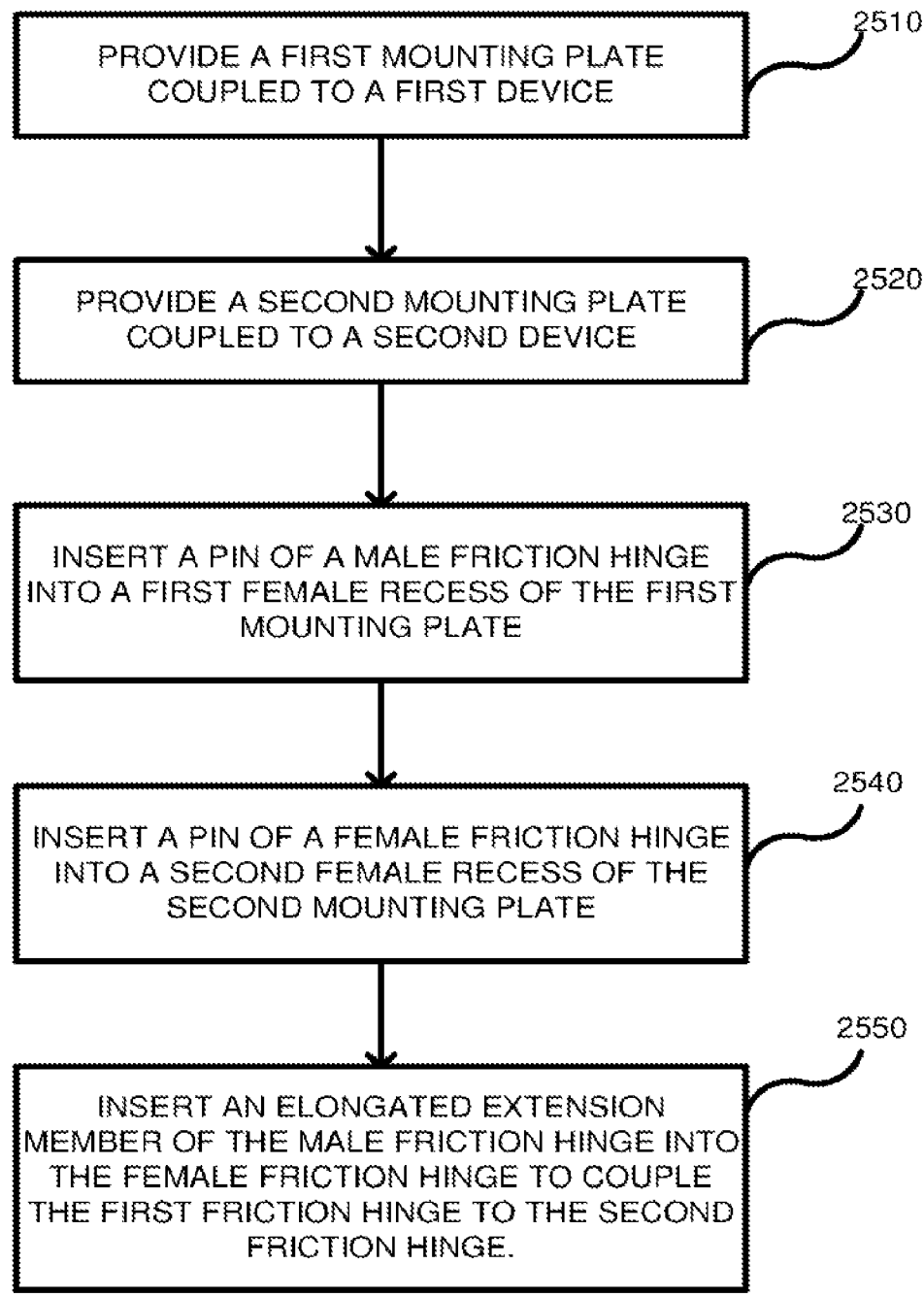
FIG. 25 is a flowchart of a method for assembling a friction hinge according to another embodiment.

FIG. 25 is a flowchart of a method according to one embodiment for coupling at least two different types of friction hinges. In process block 2510, a first mounting plate is provided and coupled to the first device. In process block 2520, a second mounting plate is provided and coupled to the second device. In process block 2530, a pin of a male friction hinge is inserted into the first mounting plate. In process block 2540, a pin of a female friction hinge is inserted into the second mounting plate. In process 2550, an elongated extension member of the male friction hinge is inserted into the female friction hinge to interconnect the two friction hinges together. Thus, two different types of friction hinges are connected together so as to coordinate rotational movement as the first and second devices rotate relative to one another.

The devices described herein can be any of a variety of electronic devices including a laptop, notebook, netbook, or the like. One or more of the devices can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The terms "system" and "device" are used interchangeably herein. Unless the context clearly indicates otherwise, neither term implies any limitation on a type of computing system or computing device. In general, a computing system or device can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

The following paragraphs further describe embodiments of the hinge mechanism:

A. A hinge for coupling at least first and second devices, comprising:
  a first coupling member for coupling to the first device;
  a second coupling member for coupling to the second device;
  at least a first flexible connection member being substantially S-shaped with the first and second devices in an open tablet configuration, the first flexible connection member coupled at one end to the first coupling member and at an opposite end to the second coupling member; and
  at least one tightening member coupled to the at least first flexible connection member to maintain a selected tension in the at least first flexible connection member.

B. The hinge of paragraph A, further including at least a second flexible connection member that is a mirrored S-shape and coupled between the first and second coupling members, the second flexible connection member forming a cross-configuration with the first flexible connection member.

C. The hinge of any of paragraphs A-B, wherein the first coupling member includes a first hinge lug having a first channel for receiving the first flexible connection member and wherein the second coupling member includes a second hinge lug having a second channel for receiving the first flexible connection member, the first hinge lug being shaped so as to create a bend in the first flexible connection member and the second hinge lug being shaped so as to create a reverse bend in the flexible connection member.

D. The hinge of any of paragraphs A-C, wherein the tightening member includes a termination device coupled to the first flexible connection member and the second flexible connection member, with a screw designed to move the termination device so as to selectively increase the tension in the first and second flexible connection members simultaneously.

E. The hinge of paragraph D, wherein the screw is exposed with the first and second devices in a closed position so that the screw can be adjusted with the hinge assembled to the first and second devices.

F. The hinge of any of paragraphs A-E, wherein the first device has a first end and a second device has a second end, and wherein the hinge couples the first end of the first device to the second end of the second device.

G. The hinge of any of paragraphs A-F, wherein the first flexible connection member extends between the first and second ends substantially parallel to the first and second ends for at least a portion of the first flexible connection member.

H. The hinge of any of paragraphs A-G, wherein the flexible connection member is one of the following: a cable, a wire, a conductor, a belt, an optical fiber, or a chain.

I. The hinge of any of paragraphs A-H, wherein the at least one tightening member includes a spring.

J. The hinge of any of paragraphs A-I, wherein the first coupling member is a first hinge lug and the second coupling member is a second hinge lug, the first and second hinge lugs being mounted on the first and second devices, respectively, so as to face each other, with the first flexible connection member passing over the first hinge lug and under the second hinge lug so as to form the substantially S-shape.

K. The hinge of paragraph J, further including a second flexible connection member passing under the first hinge lug and over the second hinge lug to form a mirrored S-shape and a cross configuration between the first flexible connection member and the second flexible connection member.

L. An assembly including a hinge, comprising:
  a first device having first front and back faces and at least a first end between the first front and back faces and a second device having second front and back faces and at least a second end between the second front and back faces;
  a first coupling mechanism attached to the first device adjacent to the first end;
  a second coupling mechanism attached to the second device adjacent the second end;
  at least first and second flexible connection members coupled to the first and second coupling mechanisms in a cross configuration, the first flexible connection member following an S-shaped path and the second flexible connection member following a mirrored S-shaped path with the first and second devices in an open position; and
  at least first and second tightening mechanisms coupled to the first and second flexible connection members, respectively, to tighten the first and second flexible connection members and maintain the first and second ends in close proximity.

M. The assembly of paragraph L, wherein the first and second coupling mechanisms each have top and bottom sloped channels, and wherein the first flexible connection member is positioned within the top sloped channel of the first coupling mechanism and positioned within the bottom sloped channel of the second coupling mechanism so that the first flexible connection member follows the S-shaped path.

N. The assembly of any of paragraphs L-M, wherein the first tightening mechanism is a wire termination that is a fixed connection to an end of the first flexible connection member and an end of the second flexible connection member.

O. The assembly of paragraph N, further including a screw threaded through the first coupling mechanism and in contact with the wire termination so as to selectively tighten the first and second flexible connection members simultaneously.

P. The assembly of any of paragraphs L-O, wherein the S-shaped path includes a first end portion of the flexible connection member within a channel of the first coupling mechanism, a bend in the first flexible connection member caused by the first coupling mechanism, a middle portion wherein the first flexible connection member extends parallel to the first and second ends, a reverse bend caused by the second coupling mechanism, and a second end portion of the flexible connection member within a channel of the second coupling mechanism.

Q. A method of coupling first and second devices, comprising:
  providing a first hinge lug coupled to the first device, the first hinge lug having top and bottom channels;
  providing a second hinge lug coupled to the second device, the second hinge lug having top and bottom channels;
  coupling a first flexible connection member in the bottom channel of the first hinge lug and in the top channel of the second hinge lug;
  coupling a second flexible connection member in the top channel of the first hinge lug and the bottom channel of the second hinge lug, so that the first and second flexible connection members are in a cross-configuration;
  coupling the first and second flexible connection members to a termination block; and
  tightening the first and second flexible connection members using the termination block.

R. The method of paragraph Q, wherein the tightening includes screwing a screw that pushes on the termination block, the screw being threaded through the first or second hinge lug.

S. The method of any of paragraphs Q-R, wherein the first flexible connection member follows an S-shaped path and the second flexible connection member follows a mirrored S-shaped path.

T. The method of any of paragraphs Q-S, where the first and second devices are coupled end-to-end and rotate 360 degrees.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A hinge assembly for coupling at least a first computing device to a second computing device, comprising:
  a first friction hinge, wherein the first friction hinge includes an extension member with an elongated slot formed therein;
  a second friction hinge, wherein the second friction hinge includes a slot pin sized to fit within the elongated slot; and
  wherein the slot pin and the elongated slot form a geared connection coupling the first friction hinge to the second friction hinge, wherein the first computing device is connected to the first friction hinge and a second computing device is connected to the second friction hinge, wherein when rotating the first computing device to the second computing device from a fully open position to a position of about 90 degrees, wherein in the fully open position, a distance between the extension member on the first friction hinge and a recess end of a recess of the second friction hinge is maximized, wherein rotating the first friction hinge relative to the second friction hinge causes the extension member to move radially in the recess, wherein in the position of about 90 degrees, a distance between the extension member and the recess end is minimized so that the extension member contacts the recess end.

2. The hinge assembly of claim 1, wherein the extension member is symmetrical on top and bottom.

3. The hinge assembly of claim 1, wherein the slot pin slides within the elongated slot in a radial direction.

4. The hinge assembly of claim 1, further comprising a cap member snapped onto a top of the hinge assembly.

5. The hinge assembly of claim 1, wherein the first friction hinge includes a first pin extending perpendicularly from the first friction hinge and sized to fit within a first receptacle, wherein the first pin forms a first axis of rotation.

6. The hinge assembly of claim 5, wherein the second friction hinge includes a second pin extending perpendicularly from the second friction hinge and sized to fit within a second receptacle, wherein the second pin forms a second axis of rotation.

7. The hinge assembly of claim 1, wherein when rotating the first computing device relative to the second computing device to a fully closed position, wherein rotating the first computing device relative to the second computing device causes the distance between the extension member and the recess end to increase.

8. The hinge assembly of claim 1, wherein the slot pin is coupled within the elongated slot, the first friction hinge having a first axis, the second friction hinge having a second axis, wherein the first axis and the second axis are rotated in unison through the geared connection between the first friction hinge and the second friction hinge.

9. A computing assembly, comprising:
a first computing device including a first mounting plate;
a second computing device including a second mounting plate; and
a hinge assembly, including:
a first friction hinge connected to the first mounting plate, wherein the first friction hinge rotates about a first axis, wherein the first friction hinge includes an extension member slidable in a radial direction;
a first coupling portion connected to the extension member;
a second friction hinge connected to the second mounting plate, wherein the second friction hinge rotates about a second axis;
a second coupling portion, wherein the second coupling portion is a recess in the second friction hinge; and
a connection coupling the first friction hinge to the second friction hinge, wherein when rotating the first computing device to the second computing device from a fully open position to a position of about 90 degrees, wherein in the fully open position, a distance between the first coupling portion of the extension member on the first friction hinge and a recess end of the recess of the second coupling portion is maximized, wherein rotating the first computing hinge relative to the second computing hinge causes the first coupling portion of the extension member to move radially in the second coupling portion, wherein in the position of about 90 degrees, a distance between the first coupling portion of the extension member and the recess end is minimized so that the first coupling portion of the extension member contacts the recess end.

10. The computing assembly of claim 9, wherein the first friction hinge and the second friction hinge rotate in unison.

11. The computing assembly of claim 10, wherein, as the first friction hinge and the second friction hinge rotate in unison, the first coupling portion and the second coupling portion move toward and away from each other.

12. The computing assembly of claim 9, wherein holding forces generated by the first friction hinge are passed to the second friction hinge.

13. The computing assembly of claim 9, wherein the first coupling portion includes a first pin extending perpendicularly from the first friction hinge and sized to fit within a first receptacle, wherein the first pin includes the first axis.

14. The computing assembly of claim 13, wherein the second coupling portion includes a second pin extending perpendicularly from the second friction hinge and sized to fit within a second receptacle, wherein the second pin includes the second axis.

15. A method for connecting a computing assembly, comprising:
connecting a first computing device to a first friction hinge and a second computing device to a second friction hinge, the first friction hinge being connected to the second friction hinge with a geared connection;
rotating the first computing device to the second computing device from a fully open position to a position of about 90 degrees, wherein in the fully open position, a distance between an extension member on the first friction hinge and a recess end of a recess on the second friction hinge is maximized, wherein rotating the first computing device relative to the second computing device causes the extension member to move radially in the recess, wherein in the position of about 90 degrees, a distance between the extension member and the recess end is minimized;
rotating the first computing device relative to the second computing device to a position of about 180 degrees, wherein rotating the first computing device relative to the second computing device causes the distance between the extension member and the recess end to increase; and
rotating the first computing device relative to the second computing device to a position of 270 degrees, wherein rotating the first computing device relative to the second computing device causes the distance between the extension member and the recess end to decrease.

16. The method of claim 15, wherein, in the position of about 90 degrees, the extension member contacts the recess end.

17. The method of claim 15, wherein, in the position of about 180 degrees, the distance between the extension member and the recess end is maximized.

18. The method of claim 15, further comprising rotating the first computing device relative to the second computing device to a fully closed position, wherein rotating the first computing device relative to the second computing device causes the distance between the extension member and the recess end to increase.

19. The method of claim 15, wherein the extension member is coupled within the recess, the first friction hinge having a first axis, the second friction hinge having a second axis, wherein the first axis and the second axis are rotated in unison through the geared connection between the first friction hinge and the second friction hinge.

* * * * *